US009266444B2

(12) United States Patent
Takamuku et al.

(10) Patent No.: US 9,266,444 B2
(45) Date of Patent: Feb. 23, 2016

(54) LITHIUM ION SECONDARY BATTERY, ELECTRIC TOOL, ELECTRIC VEHICLE, AND POWER STORAGE SYSTEM

(75) Inventors: Akira Takamuku, Fukushima (JP); Kazuaki Endoh, Fukushima (JP); Masaharu Senoue, Fukushima (JP); Guohua Li, Saitama (JP); Yosuke Hosoya, Fukushima (JP); Kenichi Kawase, Fukushima (JP)

(73) Assignee: SONY CORPORATION, Tokyo (JP)

( * ) Notice: Subject to any disclaimer, the term of this patent is extended or adjusted under 35 U.S.C. 154(b) by 669 days.

(21) Appl. No.: 13/335,305

(22) Filed: Dec. 22, 2011

(65) Prior Publication Data

US 2012/0301786 A1 Nov. 29, 2012

(30) Foreign Application Priority Data

Dec. 28, 2010 (JP) ................................ P2010-293267

(51) Int. Cl.

*H01M 4/131* (2010.01)
*B60L 11/18* (2006.01)
*H01M 4/1391* (2010.01)
*H01M 4/38* (2006.01)
*H01M 4/485* (2010.01)
*H01M 4/505* (2010.01)

(Continued)

(52) U.S. Cl.

CPC ......... *B60L 11/1879* (2013.01); *B60L 11/1874* (2013.01); *H01M 4/131* (2013.01); *H01M 4/1391* (2013.01); *H01M 4/386* (2013.01); *H01M 4/387* (2013.01); *H01M 4/485* (2013.01); *H01M 4/505* (2013.01); *H01M 4/525* (2013.01); *H01M 10/0525* (2013.01); *B60L 2240/545* (2013.01); *H01M 2300/0085* (2013.01); *Y02E 60/122* (2013.01); *Y02T 10/7005* (2013.01); *Y02T 10/705* (2013.01); *Y02T 10/7011* (2013.01)

(58) Field of Classification Search

CPC ...................................................... H01M 4/131
USPC .......... 429/223, 231.8, 232, 224, 231.95, 330
See application file for complete search history.

(56) References Cited

U.S. PATENT DOCUMENTS 6,677,082 B2 1/2004 Thackeray et al.
7,638,240 B2 * 12/2009 Li ................................ 429/224

(Continued)

FOREIGN PATENT DOCUMENTS

JP 2004-528691 9/2004
JP 2004-362934 12/2004

(Continued)

*Primary Examiner* — Patrick Ryan
*Assistant Examiner* — Alex Usyatinsky
(74) *Attorney, Agent, or Firm* — Hazuki International, LLC

(57) ABSTRACT

A lithium ion secondary battery includes a positive electrode, a negative electrode, and an electrolytic solution. The positive electrode contains a lithium composite oxide. The negative electrode contains a material including at least one of silicon Si and tin Sn as a constituent element. The lithium composite oxide includes lithium Li having a composition ratio a, a first element having a composition ratio b, and a second element having a composition ratio c as a constituent element. The first element including two kinds or more selected from among manganese Mn, nickel Ni, and cobalt Co, and including at least manganese. The second element including at least one kind selected from among aluminum Al, titanium Ti, magnesium Mg, and boron B. The composition ratios a to c satisfy the relationships of $1.1<a<1.3$, $0.7<b+c<1.1$, $0<c<0.1$, and $a>b+c$.

19 Claims, 4 Drawing Sheets

14 25 15A 15 16 17 12 11 20 21 22 23 24 13 26

(51) Int. Cl.

*H01M 4/525* (2010.01)
*H01M 10/0525* (2010.01)

(56) References Cited

U.S. PATENT DOCUMENTS

2003/0027048 A1 2/2003 Lu et al.
2003/0170540 A1 9/2003 Ohzuku et al.
2004/0053133 A1 3/2004 Li
2004/0234855 A1 11/2004 Li
2005/0136329 A1 6/2005 Howard, Jr. et al.
2006/0204854 A1* 9/2006 Fujimoto et al. ............. 429/303
2007/0037043 A1 2/2007 Chang et al.
2007/0042269 A1 2/2007 Chang et al.
2007/0122703 A1 5/2007 Whitfield et al.
2007/0148546 A1 6/2007 Shimizu et al.
2007/0218359 A1* 9/2007 Shimizu et al. ............... 429/223
2007/0218360 A1 9/2007 Tabuchi et al.
2008/0070122 A1 3/2008 Park et al.
2009/0011334 A1 1/2009 Shizuka et al.
2009/0011335 A1 1/2009 Takeda et al.
2009/0104532 A1* 4/2009 Hosoya ......................... 429/224
2009/0220859 A1* 9/2009 Yoon et al. .................... 429/220
2010/0233542 A1 9/2010 Endo et al.
2010/0233543 A1 9/2010 Numata et al.
2010/0273057 A1* 10/2010 Watanabe et al. ............. 429/223

FOREIGN PATENT DOCUMENTS

JP 2005-235628 9/2005
JP 3873717 1/2007
JP 2007-503102 2/2007
JP 2007-516583 6/2007
JP 2007-200865 8/2007
JP 2007-242581 9/2007
JP 2008-047306 2/2008
JP 2008-063211 3/2008
JP 2008-078139 4/2008
JP 2008-091041 4/2008
JP 4080337 4/2008
JP 2008-127211 6/2008
JP 4106651 6/2008
JP 2007-220630 8/2008
JP 2008-300180 12/2008
JP 2009-004285 1/2009
JP 2009-009753 1/2009
JP 2009-503766 1/2009
JP 2009-505367 2/2009
JP 4219391 2/2009
JP 2009-123400 6/2009
JP 2009-152114 7/2009
JP 2009-158320 7/2009
JP 2009-158415 7/2009
JP 2009-179501 8/2009
JP 2009-206100 9/2009
JP 2009-218112 9/2009
JP 2009-259505 11/2009
JP 2009-274940 11/2009
JP 443910 3/2010

* cited by examiner

LITHIUM ION SECONDARY BATTERY, ELECTRIC TOOL, ELECTRIC VEHICLE, AND POWER STORAGE SYSTEM

CROSS REFERENCES TO RELATED APPLICATIONS

The present application claims priority to Japanese Patent Application No. 2010-293267 filed on Dec. 28, 2010, the disclosure of which is incorporated herein by reference.

BACKGROUND

The present disclosure relates to a lithium ion secondary battery using a lithium composite oxide as a positive electrode active material of a positive electrode, an electric tool, an electric vehicle, and a power storage system which use the lithium ion secondary battery.

In recent years, a small-sized electronic apparatus represented by a portable terminal device or the like has become widespread, and a further reduction in size and weight, and a long operation lifespan are strongly demanded. Along with this, a development of a battery as a power source, particularly, a secondary battery, which is small in size and is light in weight, and which can obtain a high energy density, has been progressed. In recent years, this secondary battery has been reviewed for an application for use in a large-sized electronic apparatus such as a vehicle while not being limited to a small-sized electronic apparatus.

As secondary batteries, secondary batteries using various charge and discharge principles have been widely proposed, but among these, a lithium ion secondary battery using occlusion and emission of lithium ions has attracted attention. This is because an energy density higher than that in a lead battery, a nickel-cadmium battery, or the like, can be obtained.

The lithium ion secondary battery includes a positive electrode, a negative electrode, and an electrolytic solution, and the positive electrode and the negative electrode include a positive electrode active material and a negative electrode active material that occludes and emits lithium ions, respectively. As the positive electrode active material, a lithium composite oxide including lithium and a lithium transition metal as a constituent element has been widely used. The selection of the positive electrode active material that is directly related to a charge and discharge reaction has a large effect on a battery performance, such that various studies have been undertaken with respect to the composition of the lithium composite oxide.

Specifically, to obtain a large capacity and a high potential, and to improve charge and discharge cycle characteristics, there is proposed a method in which a lithium composite oxide expressed by $Li_aMI_bMII_cO_d$ (MI includes Mn, Ni, Co, or the like, MII includes Al or the like, $1.1<a<1.5$, $0.9<b+c<1.1$, $1.8<d<2.5$) is used (for example, refer to a specification of Japanese Patent No. 3873717). However, a composition ratio (Li/the sum of MI and MII) of Li with respect to the sum of MI and MII is larger than 1 in a mole ratio.

To ameliorate a loss of a positive electrode capacity caused by an irreversible capacity of an Si-based or Sn-based negative electrode active material, and to sufficiently utilize a high capacity characteristic of the negative electrode active material, there is proposed a method in which a lithium-rich lithium composite oxide expressed by $Li_hMn_iCo_jNi_kO_2$ is used (for example, refer to Japanese Unexamined Patent Application Publication No. 2009-158415). Here, $h=[3(1+x)+4a]/3(1+a)$, $i=[3\alpha(1+x)+2a]/3(1+a)$, $j=\beta(1-x)/(1+a)$, $k=\gamma(1-x)/(1+a)$, $0<a<1$, $\alpha>0$, $\beta>0$, $\gamma>0$, $\alpha+\beta+\gamma=1$, $0\leq x<1/3$. This composite oxide is a solid solution expressed by $Li_{1+x}(Mn\alpha Co\beta Ni\gamma)_{1-x}O_2.aLi_{4/3}Mn_{2/3}O_2$. However, the cycle characteristics are not sufficiently satisfied.

SUMMARY

Recently, a high performance and a multi-function in electronic apparatuses have progressed, and a frequency of use has been increased, such that charge and discharge of a lithium ion secondary battery has a tendency to be frequently repeated. Therefore, it is desirable to newly improve the battery capacity and cycle characteristics.

Particularly, as a negative electrode active material, the use of a metal-based material (excluding lithium) such as silicon, tin, and an oxide thereof instead of carbon material such as graphite shows promise for realizing a high capacity. However, when these metal-based materials are used, an irreversible capacity that occurs during charge and discharge at the first time (first cycle) in the negative electrode is large, and it is necessary to use a positive electrode active material in surplus to that extent, and therefore a capacity loss occurs. In addition, the above-described metal-based material has a noble electrode potential compared to a carbon material such as graphite, and when the metal-based material is used in the same charge potential, a positive electrode active material that is combined with the metal-based material also has a noble electrode potential compared to the carbon material such as graphite, such that cycle characteristics are apt to decrease. Therefore, it is necessary to secure the battery capacity characteristic and the cycle characteristics even when using the metal-based material.

The present disclosure is made in consideration of the problems, and it is desirable to provide a lithium ion secondary battery, an electric tool, an electric vehicle, and a power storage system which can obtain an excellent battery capacity characteristic and cycle characteristics.

According to an embodiment of the present disclosure, there is provided a lithium ion secondary battery including a positive electrode, a negative electrode, and an electrolytic solution. The positive electrode contains a lithium composite oxide, and the negative electrode contains a material including at least one of silicon and tin as a constituent element. The lithium composite oxide includes lithium Li having composition ratio a, and a second element having composition ratio c as a constituent element, said first element including two kinds or more selected from among, manganese, nickel, and cobalt, and including at least manganese, and said second element including at least one kind selected from among aluminum, titanium, magnesium, and boron, and the composition ratios a to c satisfy the following relationships: $1.1<a<1.3$, $0.7<b+c<1.1$, $0<c<0.1$, and $a>b+c$. In addition, according to other embodiments of the present disclosure, there are provided an electric tool, an electric vehicle, and a power storage system which utilizes the above-described lithium ion secondary battery.

According to the lithium ion secondary battery of the present disclosure, the positive electrode contains a lithium composite oxide, and the negative electrode contains a material including at least one of silicon and tin as a constituent element. In this case, deterioration in a cycle characteristic caused by the positive electrode is suppressed. This is considered to be because a crystalline structure of the lithium composite oxide is stabilized, such that a lithium ion is easily occluded and emitted. In addition, when the charge voltage during the charge of the first time is set to a high voltage, the charge capacity of the positive electrode increases greatly, and therefore an irreversible capacity that occurs in the negative electrode is compensated. Therefore, decrease in the battery capacity, which is caused by the irreversible capacity, is suppressed. As a result, a property of increasing the irreversible capacity is provided, such that even when a negative electrode active material having a noble electrode potential compared to a carbon material such as graphite is used, it is possible to obtain a high discharge capacity and it is difficult for the discharge capacity to decrease even when charge and discharge are repeated, and as a result thereof, it is possible to obtain an excellent battery capacity and cycle characteristics.

Additional features and advantages are described herein, and will be apparent from the following Detailed Description and the figures.

DETAILED DESCRIPTION

Embodiments of the present application will be described below in detail with reference to the drawings. In addition, the description will be made in the following order.

1. Lithium Ion Secondary Battery
1-1. Cylinder Type
1-2. Laminated Film Type
2. Use of Lithium Ion Secondary Battery

1. Lithium Ion Secondary Battery

1-1. Cylinder Type

Figure 1:
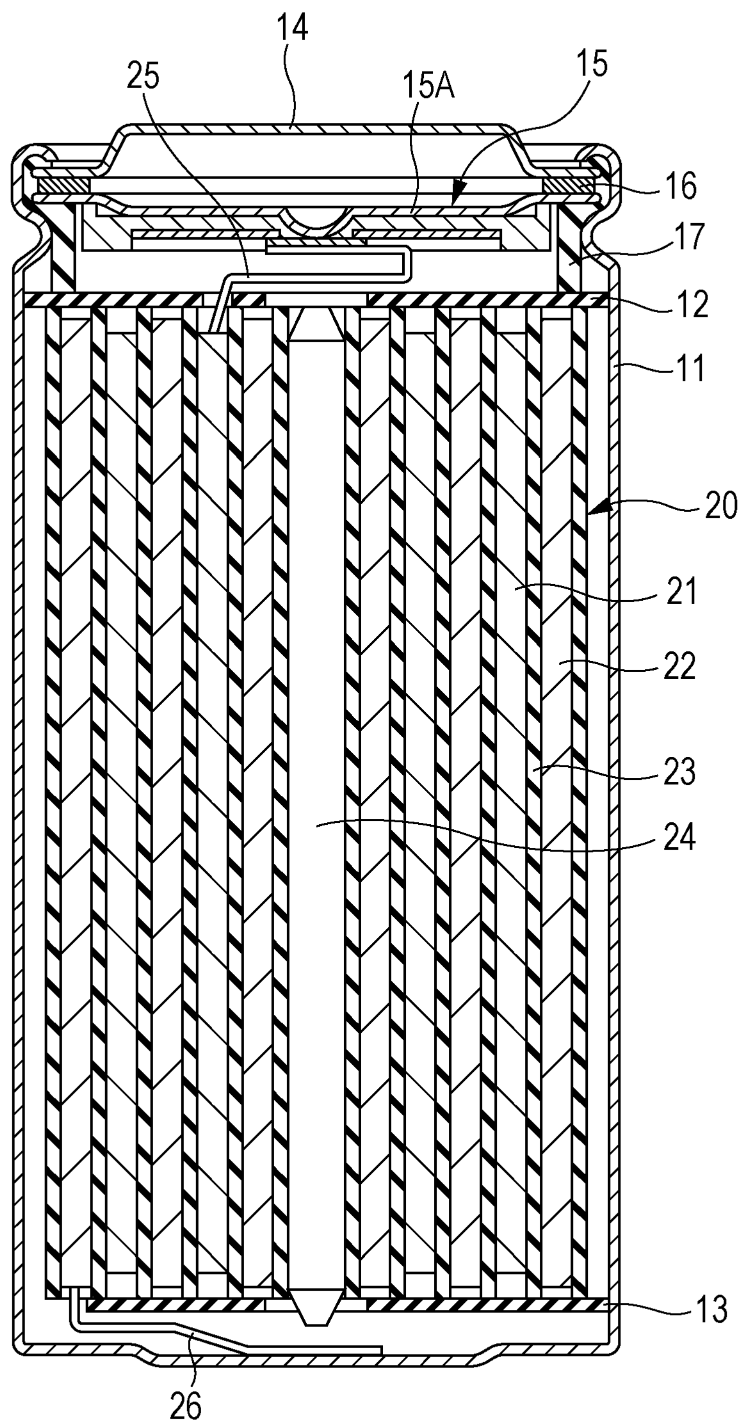
FIG. 1 is a cross-sectional view illustrating a configuration of a lithium ion secondary battery (cylinder type) according to an embodiment of the present disclosure.
Figure 2:
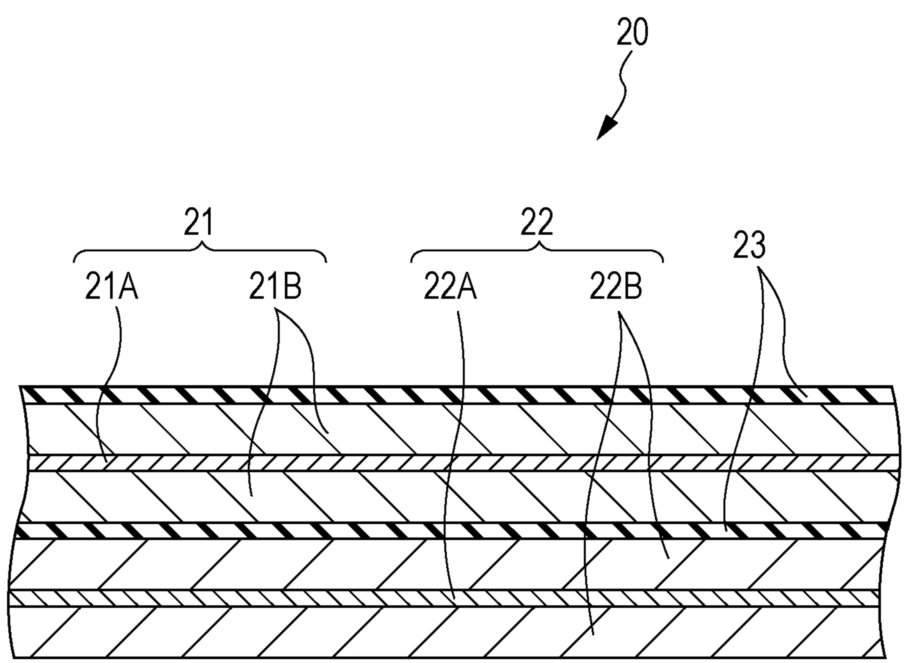
FIG. 2 is an enlarged cross-sectional view illustrating a part of a wound electrode body shown in FIG. 1.

FIGS. 1 and 2 show a cross-sectional configuration of a lithium ion secondary battery (hereinafter, referred to as a "secondary battery"), and FIG. 2 shows an enlarged part of a wound electrode body 20 shown in FIG. 1.

Overall Configuration of Secondary Battery

The secondary battery mainly includes the wound electrode body 20 and a pair of insulating plates 12 and 13 which are accommodated inside a hollow columnar battery casing 11, and is a cylinder type. The wound electrode body 20 is a wound laminated body in which a positive electrode 21 and a negative electrode 22 are laminated with a separator 23 interposed therebetween and this laminated body is wound.

The battery casing 11 has a hollow structure in which one end portion is closed and the other end portion is opened, and is formed of, for example, iron, aluminum, an alloy thereof, or the like. In addition, in a case where the battery casing 11 is formed of iron, nickel or the like may be plated on a surface of the battery casing 11. The pair of insulating plates 12 and 13 is disposed so as to extend in a direction orthogonal to a winding circumferential surface with the wound electrode body 20 interposed therebetween in a vertical direction.

At the opened end portion of the battery casing 11, a battery lid 14, a safety valve mechanism 15, and a PTC (positive temperature coefficient) element 16 are caulked through a gasket 17. In this manner, the battery casing 11 is sealed. The battery lid 14 is formed of, for example, the same material as that of the battery casing 11. The safety valve mechanism 15 and the PTC element 16 are provided at an inner side of the battery lid 14, and the safety valve mechanism 15 is electrically connected to the battery lid 14 through the PTC element 16. The safety valve mechanism 15 is configured in such a manner that when an internal pressure becomes a predetermined value or more due to an internal short circuit, heating from outside, or the like, a disc plate 15A is inverted and the electrical connection between the battery lid 14 and the wound electrode body 20 is disconnected. The PTC element 16 prevents abnormal heat generation caused by a large current through an increase in resistance corresponding to a temperature rising. The gasket 17 is formed of, for example, an insulating material, and asphalt may be applied on a surface thereof.

At the center of the wound electrode body 20, a center pin 24 may be inserted. A positive electrode lead 25 formed of a conductive material such as aluminum is connected to the positive electrode 21, and a negative electrode lead 26 formed of a conductive material such as nickel is connected to the negative electrode 22. The positive electrode lead 25 is connected to the safety valve mechanism 15 through a welding or the like, and is electrically connected to the battery lid 14. The negative electrode lead 26 is connected to the battery casing 11 through a welding or the like, and is electrically connected thereto.

Positive Electrode

The positive electrode 21 includes a positive electrode current collector 21A and a positive electrode active material layer 21B provided on a surface or both surfaces of the positive electrode current collector 21A. The positive electrode current collector 21A is formed of a conductive material such as aluminum, nickel, and stainless steel.

The positive electrode active material layer 21B includes a lithium composite oxide having a composition described below (hereinafter, referred to as a lithium composite oxide) as a positive electrode active material that can occlude and emit lithium ions. In addition, the positive electrode active material layer 21B may include another material such as a positive electrode binding agent or a positive electrode conducting agent according to necessity.

The lithium composite oxide includes lithium having composition ratio a, a first element having composition b, and a second element having composition c as a constituent element, the first element including two kinds or more selected from among manganese, nickel, and cobalt, and including at least manganese, and the second element including at least one kind selected from among aluminum, titanium, magnesium, and boron. However, the composition ratios a to c satisfy the following relationships: $1.1<a<1.3$, $0.7<b+c<1.1$, $0<c<0.1$, and $a>b+c$.

As is clear from this the composition ratio of the first and second element satisfies a relationship of $a>b+c$, the lithium composite oxide is a so-called lithium-rich composite oxide and includes excess of lithium as a constituent element. This is because, as described below, even when the negative electrode active material layer 22B of the negative electrode 22 includes, as a negative electrode active material, a metal-based material having a property of increasing an irreversible capacity, it is possible to obtain an excellent battery capacity characteristic and cycle characteristics.

Specifically, it is known that during charge period at the first time of a secondary battery, a film (SEI (solid electrolyte interface) film or the like) is formed on a surface of the negative electrode 22, such that the irreversible capacity occurs. Along with this, lithium ions emitted from the positive electrode active material during the charge of the first time are consumed to cause the irreversible capacity. In this regard, in a case where the first element is within the above-described composition range, and therefore the lithium composite oxide is a lithium-rich lithium composite oxide, when a charge voltage during the charge of the first time is set to a high voltage (for example, 4.5 V), a sufficient number of lithium ions are emitted from the positive electrode active material, and therefore the irreversible capacity occurring in the negative electrode 22 is compensated. In addition, when the second element is included, a crystalline structure of the lithium composite oxide is stably maintained. Therefore, the negative electrode active material has a property of increasing the irreversible capacity, such that even in a metal-based material having a noble electrode potential compared to a carbon material such as graphite, decrease in the battery capacity caused by loss due to the irreversible capacity during charge and discharge at the first time is suppressed, and sufficient cycle characteristics are obtained.

In addition, the metal-based material is a material including at least one of silicon and tin as a constituent element, and more particularly, the metal-based material is at least one kind selected from among an elementary substance, an alloy, and a compound of silicon, and an elementary substance, an alloy, and a compound of tin. Among these, an oxide of silicon or tin, more particularly, a silicon oxide ($SiO_v$: $0.2<v<1.4$) or the like has a property of increasing the irreversible capacity. This is because lithium ions emitted from the positive electrode active material easily and irreversibly react (couple) with oxygen in the oxide. In addition, this is because a volume variation accompanied with the occlusion and emission of the lithium ions is large, such that when conductivity is insufficient, charge and discharge efficiency at the first time is apt to decrease.

The first element is an element that serves as a main body of redox, and as described above, includes two kinds or more (including at least manganese) selected from among manganese, nickel, and cobalt. That is, the first element includes two kinds of manganese and nickel, two kinds of manganese and cobalt, or three kinds of manganese, nickel, and cobalt. This is because a high battery capacity and a high potential may be obtained. Among these, manganese and cobalt are preferable, and manganese, nickel, and cobalt are more preferable. This is because the battery capacity becomes relatively higher.

The second element is an element performing a function of stabilizing a crystalline structure of the lithium composite oxide. Therefore, in the lithium composite oxide, even when charge and discharge are repeated, it is difficult for the battery capacity characteristic and the cycle characteristics to be decreased. The second element substitutes for a part of the first element in a crystalline structure of the lithium composite oxide (not including the second element as a constituent element), and is disposed at a site of the first element. It is preferable that the second element does not include aluminum. This is because the crystalline structure of the lithium composite oxide becomes more stable.

The composition (values of a to c) of the lithium composite oxide are adjusted to obtain excellent battery capacity characteristic and cycle characteristics even when charge and discharge are repeated.

The reason why a is set to satisfy the relationship of $1.1<a<1.3$ is that when $a\leq1.1$, an absolute amount of lithium is insufficient, such that there is little effect on a significant increase in a charge capacity during charge and discharge at the first time, and on an increase in a discharge capacity during charge and discharge after the first time. In addition, this is considered to be because when $a\geq1.3$, an amount of a transition metal that contributes to oxidation and reduction of the lithium composite oxide decreases, such that the battery capacity decreases. It is preferable that a satisfy a relationship of $1.1<a<1.25$. This is because the charge capacity is secured by performing a high voltage charge at the first time, and the discharge capacity also increases. Therefore, it is possible to obtain a sufficient battery capacity, and stable cycle characteristics.

The reason why b and c are set to satisfy the relationship of $0.7<b+c<1.1$ is that when they are deviated from this range, it is difficult for the lithium composite oxide to be formed to have a single-phase layer structure, and a crystalline structure thereof is also not stable, such that the battery capacity or the like decreases. In addition, it is preferable that b and c satisfy a relationship of $0.7<b+c<0.9$. This is because a relatively large battery capacity may be obtained.

The reason why c is set to satisfy the relationship of $0<c<0.1$ is that when $c=0$, a crystalline structure of the lithium composite oxide becomes unstable. In addition, this is because when $c\geq0.1$, an absolute amount of the first element relatively decreases so much, the battery capacity decreases. In addition, a function of the second element is made to effectively reveal, it is preferable that c satisfy a relationship of $0.001<c<0.1$, and more preferably, $0.005<c<0.1$.

The lithium composite oxide may be a compound expressed by the following equation (1). The reason why d is set to satisfy a relationship of $1.8<d<2.5$ is that when it is deviated from this range, it is difficult for the lithium composite oxide to be formed to have a single-phase layer structure, and a crystalline structure thereof is also not stable, such that the battery capacity or the like decreases.

$$Li_aM1_bM2_cO_d \quad (1)$$

(here, M1 includes two kinds or more (including at least manganese) among manganese, nickel, and cobalt, M2 includes at least one kind selected from among aluminum, titanium, magnesium, and boron, and a to d satisfy the following equations: $1.1<a<1.3$, $0.7<b+c<1.1$, $0<c<0.1$, $a>b+c$, $1.8<d<2.5$)

In addition, in the lithium composite oxide, the second element may be unevenly distributed with respect to concentration in a direction from a surface of the lithium composite oxide to the center thereof, for example, the concentration of the second element may vary as it goes toward the center. In this case, the concentration of the second element may decrease or increase as it goes toward the center, or both of these may coexist. In addition, the second element may exist over an entire region ranging from the surface of the lithium composite oxide to the center thereof, or may exist only on the surface and a part in the vicinity of the surface.

This lithium composite oxide may be formed through various methods. For example, materials (raw materials) that are supply sources of respective constituent elements (Li, the first element, the second element, or the like) are mixed, and then the resultant mixture is baked at a high temperature. The raw materials may include, for example, lithium hydroxide (LiOH), dimanganese trioxide ($Mn_2O_3$), nickel hydroxide ($Ni(OH)_2$), cobalt hydroxide ($Co(OH)_2$), aluminum nitrate ($Al(NO_3)_3.9H_2O$), titanium dioxide ($TiO_2$), magnesium oxalate ($MgC_2O_4.2H_2O$), boron oxide ($B_2O_3$), or the like. More specifically, for example, raw materials are mixed in a predetermined ratio, the resultant mixture is mixed and crushed through ball milling in which a dispersion medium such as ethanol is used, and the resultant material is baked at a high temperature under either atmosphere or oxygen atmosphere. In addition, the raw materials are not limited to the above-described respective materials. For each material, carbonate, nitrate, oxalate, phosphate, oxide, hydroxide, or the like may be optionally selected.

In addition, it is preferable that a covering layer be provided on the surface of the lithium composite oxide to cover at least a part of the surface and include a third element as a constituent element. This is because the lithium composite oxide is protected by the covering layer, such that even when the positive electrode 21 becomes a strong oxidation state in a state of charge, a decomposition reaction of an electrolytic solution is suppressed, and a decomposition reaction and a dissolution reaction of the lithium composite oxide are also suppressed. The third element includes at least one kind selected from among magnesium, calcium Ca, titanium, zirconium Zr, sulfur S, fluorine F, iron Fe, copper Cu, boron, aluminum, phosphorous P, carbon C, manganese, nickel, and cobalt.

A kind of the third element may be in common with the second element may be different from the second element. It is preferable that the third element include an element in common with the second element. This is because an adhesion property of the covering layer with respect to the lithium composite oxide, or the like may be improved. In this case, particularly, when a content of the third element is controlled, it is preferable that at least a part of the third element be taken in a crystalline structure in a surface region of the lithium composite oxide. In addition, it is preferable that the second element included in the lithium composite oxide be an element included in such a manner that the constituent element of the lithium composite oxide is substituted with the third element included in the covering layer.

The above-described "surface region" indicates an external portion (a portion surrounding an internal portion (center portion)) of the lithium composite oxide, and more specifically, in regard to a composite oxide having a particle form, the "surface region" represents a portion ranging from the outermost surface of the composite oxide to a thickness (a depth) corresponding to 0.1% of a particle size (a median size).

In addition, "the third element is taken in a crystalline structure in a surface region" indicates that in a crystalline structure in a surface region of the lithium composite oxide, at least a part of the element constituting the crystalline structure is substituted with the third element. In addition, in the surface region, the third element may be evenly distributed in a direction from an outermost surface to a center, or may be distributed in such a manner that the abundance of the third element gradually decreases or increases in the direction. Of course, both of these distribution states may coexist.

When at least a part of the third element is taken in the crystalline structure in the surface region of the lithium composite oxide, a battery capacity characteristic and cycle characteristics are improved for the following reasons. First, a structural stability (a crystalline structure or the like) of the lithium composite oxide is improved, even when charge and discharge are repeated, it is difficult for a positive electrode active material to be damaged, and resistance of the positive electrode active material decreases. Second, a central portion (a portion not including the third element) of the lithium composite oxide is protected by the surface region including the third element, such that the central portion is isolated from an electrolytic solution. Therefore, even when the positive electrode 21 becomes a strong oxidation state in a state of charge, a decomposition reaction of the electrolytic solution is suppressed, and a decomposition reaction and a dissolution reaction in the central portion are also suppressed. Third, it is difficult for the occlusion and emission of lithium ions to be hindered compared to a case where a compound including the third element is formed on the surface of the lithium composite oxide and the surface of the lithium composite oxide is covered with the compound. This advantage may be obtained because the decomposition reaction of the electrolytic solution is suppressed as described above and thus it becomes difficult for an inactive film hindering migration of the lithium ions to be formed. Fourth, the third element is taken in the crystalline structure of the lithium composite oxide, such that even when charge and discharge are repeated, it is difficult for the third element to be detached from the lithium composite oxide compared to a case where the third element is not taken in the crystalline structure.

It is more preferable that the third element contain magnesium. This is because battery capacity and cycle characteristics may be further improved.

A content of the third element taken in the lithium composite oxide is not particularly limited, but it is preferable that the content of the third element be sufficiently smaller than the content of lithium. This is because when an absolute amount of the third element that exists on the surface region is too large, the occlusion and emission of the lithium ions may be hindered. It is preferable that in the lithium composite oxide, the content of the third element be 0.01 to 5 mol % with respect to the content of lithium. This is because sufficient battery capacity may be obtained while a protection function by the surface region is maintained.

The lithium composite oxide in which the third element is taken in the surface region thereof may be formed through various methods. For example, by using a lithium composite oxide not including the third element and a compound including the third element, a compound including the third element is deposited on the surface of the lithium composite oxide through a mechanochemical reaction and the deposited material is baked at a high temperature. In this case, it is preferable that the compound including the third element forms a solid solution with the lithium composite oxide. In addition, it is preferable that the third element substitute for a part of lithium that exists in excess in the crystalline structure in the surface region of the lithium composite oxide. This is because a relatively high effectiveness may be obtained. In addition, the compound including the third element includes, for example, magnesium phosphate or the like, but carbonate, nitrate, oxalate, phosphate, oxide, hydroxide, or the like may be optionally selected depending on the kind of the third element.

In addition, the positive electrode active material may include another kind of lithium composite oxide together with the above-described lithium composite oxide, and these may form a solid solution.

Method of Analyzing Positive Electrode Active Material

To confirm that the positive electrode active material has the above-described configuration, the positive electrode active material may be analyzed using various element analysis methods. These element analysis methods include, for example, an X-ray diffraction (XRD) method, a time of flight secondary ion mass spectrometry (TOF-SIMS) method, an inductively coupled plasma (ICP) emission spectral analysis, Raman spectroscopy, energy dispersive X-ray spectrometry (EDX), or the like. In this case, the analysis may be performed after the surface region of the lithium composite oxide is dissolved by acid or the like.

Particularly, when the second element is unevenly distributed in the lithium composite oxide, or the third element is taken in a crystalline structure of the lithium composite oxide, to investigate that the second element or the like forms a part of the crystalline structure or an existence range of the second element or the like in the crystalline structure, the XRD method is preferably used. In addition, to investigate a content of the third element in the lithium composite oxide, for example, the ICP emission spectral analysis, the TOF-SIMS method, or the EDX method may be used.

A sequence in the case of using the ICP emission spectral analysis is, for example, as follows. First, a buffer solution is added to particles of the positive electrode active material in which the third element is taken in the lithium composite oxide and is kneaded. Consequently, the buffer solution to which a particle surface of the positive electrode active material is dissolved is collected for each predetermined time and is filtered by a filter. Consequently, through the ICP emission spectral analysis, a mass of lithium and the third element contained in the buffer solution that is collected for each hour is measured. Finally, an amount of substance (mol) of lithium and the third element is calculated from the measured mass, and a mole ratio (mol %) of the third element with respect to lithium is obtained.

In addition, in a region (a region in which a positive electrode and a negative electrode are opposite to each other) where charge and discharge are performed in a secondary battery, a crystalline structure of the lithium composite oxide due to charge and discharge is apt to disappear, such that there is a possibility that the crystalline structure may not be confirmed after charge and discharge through the XRD method or the like. However, in a case where a region (not a charged and discharged region) in which charge and discharge are not performed is present in the positive electrode 21, it is preferable to analyze the positive electrode active material at that region. This is because a crystalline structure of the lithium composite oxide before charge and discharge is maintained at the not charged and discharged region, such that it is possible to analyze a composition of the positive electrode active material regardless of whether or not charge and discharge are performed. This "not charged and discharge region" includes a region where, for example, an insulating protective tape is attached on a surface of a end portion of the positive electrode 21 (positive electrode active material layer 21B) for securing safety, such that charge and discharge are not performed between the positive electrode 21 and the negative electrode 22 due to the insulating protective tape. This preference related to the analysis of the region not charged and discharged may be true for the analysis of the content of the third element.

The positive electrode binding agent includes any one kind or two kinds or more of synthetic rubber, a polymer material, or the like. The synthetic rubber includes, for example, styrene butadiene-based rubber, fluorine-based rubber, ethylene propylene diene, or the like. The polymer material includes, for example, polyvinylidene fluoride, polyimide, or the like.

The positive electrode conducting agent includes, for example, any one kind or two kinds or more of a carbon material or the like. The carbon material includes, for example, graphite, carbon black, acetylene black, ketjen black, or the like. In addition, the positive electrode conducting agent may be a metallic material, a conductive polymer, or the like as long as this material has conductivity.

Negative Electrode

The negative electrode 22 includes, for example, a negative electrode current collector 22A and a negative electrode active material 22B provided on one surface or both surfaces of the negative electrode current collector 22A.

The negative electrode current collector 22A is formed of a conductive material such as copper, nickel, and stainless steel. It is preferable that a surface of the negative electrode current collector 22A be roughened. This is because an adhesion property between the negative electrode current collector 22A and the negative electrode active material layer 22B is improved due to a so-called anchor effect. In this case, a region, which is opposite to at least the negative electrode active material layer 22B, in a surface of the negative electrode current collector 22A may be roughened. As a roughening method, for example, a method of forming a particulate material through an electrolytic treatment, or the like may be exemplified. This electrolytic treatment is a method of providing concavities and convexities by forming the particulate material on the negative electrode current collector 22A in an electrolytic bath through an electrolytic method. Copper foil formed through the electrolytic method is generally called electrolytic copper foil.

The negative electrode active material layer 22B includes, as a negative electrode active material, any one kind or two or more kinds of negative electrode materials that can occlude and emit lithium ions, and may include another material such as a negative electrode binding agent and a negative electrode conducting agent according to necessity. In addition, details of the negative electrode binding agent and the negative electrode conducting agent are the same as those of the positive electrode binding agent and the positive electrode conducting agent, for example. In the negative electrode active material layer 22B, it is preferable that a chargeable capacity of the negative electrode material be larger than a discharge capacity of the positive electrode 21 to prevent lithium metal from being precipitated unintentionally during a charge and discharge.

The negative electrode material includes, for example, a carbon material. This is because variation in a crystalline structure during occluding and emitting of lithium ions is very small, and therefore it is possible to obtain a high energy density and excellent cycle characteristics. In addition, this is because the carbon material also functions as the negative electrode conducting agent. As the carbon material, for example, easy-graphitization carbon, non-graphitization carbon in which a plane spacing of (002) plane is 0.37 nm or more, graphite in which a plane spacing of (002) plane is 0.34 nm or less, or the like may be exemplified. More specifically, pyrolytic carbon, coke, glassy carbon fiber, organic polymer compound baked body, activated charcoal, carbon black, or the like may be exemplified. Among these, as the coke, pitch coke, needle coke, petroleum coke, or the like may be exemplified. The organic polymer compound baked body may be obtained by baking (carbonizing) a polymer compound such as a phenol resin and a furan resin at an appropriate temperature. In addition to this, the carbon material may be low crystalline carbon or amorphous carbon that is subjected to a heat treatment at a temperature of approximately 1000° C. or less. In addition, the form of the carbon material may be a fiber shape, a spherical shape, a powder form, or a squamous form.

In addition, the negative electrode material is a material (metal-based material) including any one kind or two or more kinds of a metal element and a metalloid element as a constituent element. This is because a high energy density may be obtained. This metal-based material may be an elementary substance of the metal element or metalloid element, an alloy or a compound thereof, or two kinds or more of these. Furthermore, at least a part of the metal-based material may include one kind or two kinds or more of these. In addition, the alloy according to an embodiment of the present disclosure also includes a material including one kind or more of metal elements and one kind or more of metalloid elements in addition to a material including two or more kinds of metal elements. The alloy may include non-metal elements. A solid solution, a eutectoid (eutectic mixture), an intermetallic compound, two kinds or more of coexisting materials thereof, or the like are present in a structure of the alloy.

The above-described metal element or metalloid element is a metal element or metalloid element that can form an alloy together with, for example, lithium, and specifically, includes one kind or two kinds or more of the following elements: magnesium, boron, aluminum, gallium, indium, silicon, germanium Ge, tin, lead Pb, bismuth Bi, cadmium Cd, silver Ag, zinc, hafnium Hf, zirconium, yttrium, palladium Pd, or platinum Pt. Among these, it is preferable to include at least one of silicon and tin. This is because silicon and tin have an excellent capability of occluding and emitting lithium ions, such that a high energy density may be obtained.

A material including at least one of silicon and tin may be an elementary substance of silicon or tin, an alloy or a compound thereof, or two kinds or more of these. Furthermore, at least a part of the metal-based material may include one kind or two kinds or more of these. In addition, the "elementary substance" means a "substantially elementary substance" and does not necessarily mean to have a purity of 100%.

The alloy of silicon includes a material including one kind or two kinds or more of the following elements as a constituent element other than silicon: tin, nickel, copper, iron, cobalt, manganese, zinc, indium, silver, titanium, germanium, bismuth, antimony, or chromium. As the compound of silicon, for example, a compound including oxygen or carbon as a constituent element other than silicon may be exemplified. In addition, the compound of silicon may include, for example, one kind or two kinds or more of elements described above with respect to the alloy of silicon as a constituent element other than silicon.

The alloy or compound of silicon includes, for example, the following materials or the like: $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$($0<v\leq 2$), or LiSiO. In addition, in $SiO_v$, v may be in a range of $0.2<v<1.4$.

The alloy of tin includes a material including one kind or two kinds or more of the following elements as a constituent element other than tin: silicon, nickel, copper, iron, cobalt, manganese, zinc, indium, silver, titanium, germanium, bismuth, antimony, or chromium. As the compound of tin, for example, a material including oxygen or carbon as a constituent element may be exemplified. In addition, the compound of tin may include, for example, one kind or two kinds or more of elements described above with respect to the alloy of tin as a constituent element other than tin. As the alloy or compound of tin, for example, $SnO_w$ ($0<w\leq 2$), $SnSiO_3$, LiSnO, $Mg_2Sn$, or the like may be exemplified.

In addition, as the material including tin, for example, a material, which includes tin as a first constituent element and includes second and third constituent elements, is preferable. The second constituent element includes, for example, one kind or two kinds or more of the following elements: cobalt, iron, magnesium, titanium, vanadium, chromium, manganese, nickel, copper, zinc, gallium, zirconium, niobium, molybdenum, silver, indium, cerium, hafnium, tantalum, tungsten, bismuth, or silicon. The third constituent element includes, for example, one kind or two kinds or more of boron, carbon, aluminum, and phosphorus. When the material includes the second and third constituent elements, it is possible to obtain a high battery capacity and excellent cycle characteristics, such that this material is preferable.

Among these, a material (SnCoC-containing material) including tin, cobalt, and carbon is preferable. As a composition of the SnCoC-containing material, for example, there is a composition in which a content of carbon is 9.9 to 29.7 mass %, and a ratio (Co/(Sn+Co)) of a content of tin and a content of cobalt is 20 to 70 mass %. This is because within this composition range, a high energy density may be obtained.

This SnCoC-containing material has a phase including tin, cobalt, and carbon, and it is preferable that the phase have a low crystalline structure or an amorphous structure. This phase is a reaction phase that can react with lithium, and it is possible to obtain an excellent characteristic due to the presence of the reaction phase. It is preferable that a half width of a diffraction peak that can be obtained by an X-ray diffraction be 1.0° or more at a diffraction angle 2θ in a case where CuKα rays are used as specific X-rays and a sweeping velocity is set to 1.0°/min. This is because lithium ions are relatively smoothly occluded and emitted, and a reaction property of the lithium ions with an electrolytic solution decreases. In addition, the SnCoC-containing material may have a phase including an elementary substance or a part of each constituent element in addition to the low crystalline phase or the amorphous phase.

It is possible to easily determine whether or not a diffraction peak that can be obtained by X-ray diffraction corresponds to the reaction phase that can react with lithium by comparing X-ray diffraction charts before and after an electrochemical reaction with lithium. For example, in a case where the diffraction peak varies before and after the electrochemical reaction with lithium, this corresponds to the reaction phase that can react with lithium. In this case, for example, the diffraction peak of the low crystalline or amorphous reaction phase is shown in a range of $2\theta=20°$ to 50°. This is considered to be because the reaction phase includes, for example, each constituent element described above, and is crystallized to a low degree or becomes amorphous due to the presence of carbon.

In the SnCoC-containing material, it is preferable that at least a part of carbon that is a constituent element couple with a metal element or a metalloid element that is another constituent element. This is because agglomeration or crystallization of tin or the like is suppressed. It is possible to confirm a coupling state of elements through X-ray photoelectron spectroscopy (XPS). In an apparatus available in the market, for example, as soft X-rays, Al-Kα rays, Mg-Kα rays, or the like are used. In a case where at least a part of carbon is coupled with a metal element, metalloid element, or the like, a peak of a synthetic wave of the 1s orbital (C1s) of carbon appears at a region lower than 284.5 eV. In addition, it is assumed that energy correction is performed such that a peak of the 4f orbital (Au4f) of gold is obtained at 84.0 eV. At this time, commonly, surface contamination carbon is present on a material surface, such that a peak of C1s of carbon is set to 284.8 eV, and this is made as an energy reference. In an XPS measurement, a waveform of a peak of C1s is obtained in a shape including a peak of the surface contamination carbon and a peak of carbon in the SnCoC-containing material, such that, for example, analysis is performed using software available in the market and both peaks are separated. In analysis of a waveform, a location of a main peak that is present at the side of the lowest binding energy is set as an energy reference (284.8 eV).

In addition, the SnCoC-containing material may further include another constituent element. As this another constituent element, one kind or two kinds or more of silicon, iron, nickel, chromium, indium, niobium, germanium, titanium, molybdenum, aluminum, phosphorous, gallium, and bismuth may be exemplified.

A material containing tin, cobalt, iron, and carbon (SnCoFeC-containing material) other than the SnCoC-containing material is also preferable. The composition of this SnCoFeC-containing material may be arbitrarily set. For example, in a case where the content of iron is set to be small, the composition is as follows. The content of carbon is 9.9 to 29.7 mass %, the content of iron is 0.3 to 5.9 mass %, the ratio (Co/(Sn+Co)) of the content of tin and the content of cobalt is 30 to 70 mass %. In addition, for example, in a case where the content of iron is set with an extra amount, the composition thereof is as follows. The content of carbon is 11.9 to 29.7 mass %. In addition, the ratio ((Co+Fe)/(Sn+Co+Fe)) of the content of tin, the content of cobalt, and the content of iron is 26.4 to 48.5 mass %, and the ratio (Co/(Co+Fe)) of the content of cobalt and the content of iron is 9.9 to 79.5 mass %. This is because within this composition range, a high energy density may be obtained. A physical property (half width or the like) of the SnCoFeC-containing material is the same as that of the above-described SnCoC-containing material.

In addition, as another material of the negative electrode, a metal oxide, a polymer compound, or the like may be exemplified. As the metal oxide, for example, an iron oxide, a ruthenium oxide, a molybdenum oxide, or the like may be exemplified. As the polymer compound, for example, polyacetylene, polyaniline, polypyrrole or the like may be exemplified.

The negative electrode active material layer 22B may be formed through, for example, an application method, a gas phase method, a liquid phase method, a thermal spraying method, a baking method (sintering method), or two kinds or more thereof. The application method is a method in which a particulate negative electrode active material is mixed with a binding agent or the like, the resultant mixture is dispersed in a solvent such as an organic solvent, and the resultant dispersed solution is applied. As the vapor phase method, for example, a physical deposition method, a chemical deposition method, or the like may be exemplified. Specifically, a vacuum deposition method, a sputtering method, an ion plating method, a laser ablation method, a thermal chemical vapor deposition method, a chemical vapor deposition (CVD) method, a plasma chemical vapor deposition method, or the like may be exemplified. As the liquid phase method, an electroplating method, an electroless plating method, or the like may be exemplified. The thermal spraying method is a method in which the negative electrode active material is sprayed in a molten state or a semi-molten state. The baking method is a method in which application is performed by the same sequence as that of the application method, and then a heat treatment at a temperature higher than that of the binding agent or the like is performed. In regard to the baking method, an existing method may be used, and, for example, an atmospheric baking method, a reaction baking method, a hot press baking method, or the like may be exemplified.

Separator

The separator 23 isolates the positive electrode 21 and the negative electrode 22, and allows lithium ions to pass therethrough while preventing a short circuit of a current caused by a contact between both electrodes. A liquid electrolyte (electrolytic solution) is impregnated in the separator 23. The separator 23 is formed of a porous film or the like including, for example, a synthetic resin or ceramic, and may have a structure in which two kinds or more of these porous films are laminated. As the synthetic resin, for example, polytetrafluoroethylene, polypropylene, or polyethylene, or the like may be exemplified.

Electrolyte

The electrolyte includes a solvent and an electrolytic salt, and may further include various additives according to necessity.

The solvent includes, for example, one kind or two kinds or more of the following nonaqueous solvents (organic solvents): ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethyl acetate, ethyl trimethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, or dimethyl sulfoxide. This is because an excellent battery capacity, excellent cycle characteristics, and excellent storage characteristics may be obtained.

Among these, at least one kind selected from among ethylene carbonate, propylene carbonate, dimethyl carbonate, diethyl carbonate, and ethyl methyl carbonate is preferable. This is because relatively excellent characteristics may be obtained. In this case, a combination of a solvent having high viscosity (high dielectric constant) (for example, specific dielectric constant $\in \geq 30$) such as ethylene carbonate and propylene carbonate, and a solvent having low viscosity (for example, viscosity≤1 mPa.s) such as dimethyl carbonate, ethyl methyl carbonate, and diethyl carbonate may be used. This is because dissociation of the electrolyte salt and mobility of an ion are improved.

Particularly, the solvent may be cyclic carboxylic acid ester (unsaturated carbon bond cyclic carboxylic acid ester) having one or two or more unsaturated carbon bonds. This is because during charge and discharge, a stable protective film is formed on a surface of the negative electrode 22, such that a decomposition reaction of the electrolyte is suppressed. As the unsaturated carbon bond cyclic carboxylic acid ester, for example, vinylene carbonate, vinyl ethylene carbonate, or the like may be exemplified. In addition, the content of the unsaturated carbon bond cyclic carboxylic acid ester in a nonaqueous solvent is, for example, 0.01 to 10 wt %. This is because the battery capacity is not decreased so much, and a decomposition reaction of the electrolyte is suppressed.

In addition, the solvent may be at least one kind of chain carboxylic acid ester (halogenated chain carbonic acid ester) having one or two or more of halogen groups, and cyclic carboxylic acid ester (halogenated cyclic carboxylic acid ester) having one or two or more halogen groups. This is because during charge and discharge, a stable protective film is formed on a surface of the negative electrode 22, such that the decomposition reaction of the electrolyte is suppressed. The kinds of the halogen groups are not particularly limited, but among these, a fluorine group, a chlorine group, or a bromine group is preferable, and the fluorine group is more preferable. This is because a high effect may be obtained. However, as the number of halogen groups, two is preferable rather than one, and the number of halogen groups may be three or more. This is because a relatively strong and stable protective film is formed, such that a decomposition reaction of the electrolyte is more suppressed. As the halogenated chain carboxylic acid ester, for example, fluoromethyl methyl carbonate, bis(fluoromethyl) carbonate, difluoromethyl methyl carbonate, or the like may be exemplified. As the halogenated cyclic carboxylic acid ester, 4-fluoro-1,3-dioxolane-2-one, 4,5-difluoro-1,3-dioxolane-2-one, or the like may be exemplified. In addition, a content of the halogenated chain carbonic ester and the halogenated cyclic carbonic ester in a nonaqueous solvent is, for example, 0.01 to 50 wt %. This is because a battery capacity is not decreased so much, and a decomposition reaction of the electrolyte is suppressed.

In addition, the solvent may be a sultone (cyclic sulfonic acid ester). This is because a chemical target stability of the electrolytic solution is improved. As the sultone, for example, propane sultone, propene sultone, or the like may be exemplified. In addition, a content of the sultone in a nonaqueous solvent is, for example, 0.5 to 5 wt %. This is because a battery capacity is not decreased so much, and a decomposition reaction of the electrolytic solution is suppressed.

In addition, the solvent may be an acid anhydride. This is because the chemical target stability of the electrolytic solution is more improved. As the acid anhydride, for example, dicarboxylic acid anhydride, disulfonic acid anhydride, carboxylic acid sulfonic acid anhydride, or the like may be exemplified. As the dicarboxylic acid anhydride, for example, succinic anhydride, glutaric anhydride, maleic anhydride, or the like may be exemplified. As the disulfonic acid anhydride, for example, ethane sulfonic anhydride, propane disulfonic anhydride, or the like may be exemplified. As the carboxylic acid anhydride, for example, sulfobenzoic acid anhydride, sulfopropionic acid anhydride, sulfobutyric acid anhydride, or the like may be exemplified. In addition, a content of the acid anhydride in a nonaqueous solvent is, for example, 0.5 to 5 wt %. This is because a battery capacity is not decreased so much, and a decomposition reaction of the electrolytic solution is suppressed.

Electrolyte Salt

An electrolyte salt is one kind or two or more kinds of lithium salt described later. However, the electrolyte salt may be another salt (for example, light metal salt) other than the lithium salt.

As the lithium salt, for example, the following compounds or the like may be exemplified: lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate $Li_2SiF_6$), lithium chloride (LiCl), or lithium bromide (LiBr). This is because an excellent battery capacity, excellent cycle characteristics, and excellent storage characteristics may be obtained.

Among these, at least one of lithium hexafluorophosphate, lithium tetrafluoroborate, lithium perchlorate, and lithium hexafluoroarsenate is preferable, and lithium hexafluorophosphate is more preferable. This is because an internal resistance decreases, such that a relatively high effect may be obtained.

It is preferable that a content of the electrolyte salt be 0.3 to 3.0 mol/kg with respect to a solvent. This is because high ion conductivity may be obtained.

In addition, it is preferable that at least one of the positive electrode 21 (positive electrode active material layer 21B), the negative electrode 22 (negative electrode active material layer 22B), and the electrolytic solution include at least one of heteropoly acid and a heteropoly acid compound that are condensates of two kinds or more of oxoacid. This is because a film (SEI film) is formed on a surface of an electrode during charge at the first time. A film derived from the heteropoly acid compound that can occlude and emit lithium ions has excellent lithium ion permeability, such that the cycle characteristics are not deteriorated and the generation of gas (oxygen gas or the like) caused by a decomposition reaction of a positive electrode active material or the like is suppressed while reaction between an electrode and an electrolytic solution is suppressed. Therefore, it is possible to suppress swelling of a secondary battery.

The heteropoly acid compound and the heteropoly acid making up this heteropoly acid compound are compounds including polyatoms selected from the following element group (a), or compounds which include the polyatoms selected from the element group (a) and in which a part of the polyatoms is substituted with at least several elements selected from the following element group (b).

Element group (a): Mo, W, Nb, and V

Element group (b): Ti, Cr, Mn, Fe, Co, Ni, Cu, Zn, Ga, Zr, Tc, Rh, Cd, In, Sn, Ta, Re, Tl, and Pb In addition, the heteropoly acid compound and the heteropoly acid are compounds including heteroatoms selected from the following element group (c), or compounds which include the heteroatoms selected from the following element group (c) and in which a part of the heteroatoms is substituted with at least several elements selected from the following element group (d).

Element group (c): B, Al, Si, P, Cr, Mn, Fe, Co, Ni, Cu, Zn, Ge, and As

Element group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, and Np Specifically, the heteropoly acid included in the heteropoly acid compound includes, for example, heteropolytungstate such as phosphotungstic acid, tungstosilicic acid, and heteropolymolybdate such as phosphomolybdic acid and silico molybdic acid. In addition, as a material including a plurality of polyelements, phosphovanadomolybdate, phosphotungstomolybdate, silicobanadomolybdate, silicotungstomolybdate, or the like may be exemplified.

The heteropoly acid compound is, for example, at least one kind selected from among compounds expressed by the following equations (2) to (5).

$$H_xA_y(BD_6O_{24}).zH_2O \quad (2)$$

(A represents lithium, sodium Na, potassium K, rubidium Rb, cesium Ce, magnesium, calcium, aluminum, ammonium ($NH_4$), ammonium salt, or phosphonium salt. B represents phosphorous, silicon, arsenic As, or germanium Ge. D represents at least one kind selected from among titanium, vanadium V, chromium Cr, manganese, iron, cobalt, nickel, copper, zinc Zn, gallium Ga, zirconium, niobium Nb, molybdenum Mo, technetium Tc, rhodium Rh, cadmium Cd, indium In, tin, tantalum Ta, tungsten W, rhenium Re, and thalium Tl. x, y, and z satisfy relationships of $0 \le x \le 8$, $0 \le y \le 8$, and $0 \le z \le 50$, and at least one of x and y is not zero)

$$H_xA_y(BD_{12}O_{40}).zH_2O \quad (3)$$

(here, A represents lithium, sodium, potassium, rubidium, cesium, magnesium, calcium, aluminum, ammonium, ammonium salt, or phosphonium salt. B represents phosphorous, silicon, arsenic, or germanium. D represents at least one kind selected from among titanium, vanadium, chromium, manganese, iron, cobalt, nickel, copper, zinc, gallium, zirconium, niobium, molybdenum, technetium, rhodium, cadmium, indium, tin, tantalum, tungsten, rhenium, and thalium. x, y, and z satisfy relationships of $0 \le x \le 4$, $0 \le y \le 4$, and $0 \le z \le 50$, and at least one x and y is not zero)

$$H_xA_y(B_2D_{18}O_{62}).zH_2O \quad (4)$$

(here, A represents lithium, sodium, potassium, rubidium, cesium, magnesium, calcium, aluminum, ammonium, ammonium salt, or phosphonium salt. B represents phosphorous, silicon, arsenic, or germanium. D represents at least one kind selected from among titanium, vanadium, chromium, manganese, iron, cobalt, nickel, copper, zinc, gallium, zirconium, niobium, molybdenum, technetium, rhodium, cadmium, indium, tin, tantalum, tungsten, rhenium, and thalium. x, y, and z satisfy relationships of $0 \le x \le 8$, $0 \le y \le 8$, and $0 \le z \le 50$, and at least one of x and y is not zero)

$$H_xA_y(B_5D_{30}O_{110}).zH_2O \quad (5)$$

(here, A represents lithium, sodium, potassium, rubidium, cesium, magnesium, calcium, aluminum, ammonium, ammonium salt, or phosphonium salt. B represents phosphorous, silicon, arsenic, or germanium. D represents at least one kind selected from among titanium, vanadium, chromium, manganese, iron, cobalt, nickel, copper, zinc, gallium, zirconium, niobium, molybdenum, technetium, rhodium, cadmium, indium, tin, tantalum, tungsten, rhenium, and thalium. x, y, and z satisfy relationships of $0 \le x \le 15$, $0 \le y \le 15$, and $0 \le z \le 50$, and at least one of x and y is not zero)

Among these, at least one kind selected from among phosphomolybdic acid, phosphotungstic acid, silico molybdic acid, and tungstosilicic acid is preferable. This is because a relatively high effect may be obtained. In addition, a content of heteropoly acid or the like in the positive electrode active material layer 22B is preferably 0.01 to 3 wt %. This is because a battery capacity or the like is not decreased greatly, and generation of gas is suppressed.

It is preferable heteropoly acid compound have cations such as $Li^+$, $Na^+$, $K^+$, $Rb^+$, $Cs^+$, and $R_4N^+$, and $R_4P^{30}$ (in addition, in equations, R represents H or a hydrocarbon group having a carbon number of 10 or less). In addition, as the cations, $Li^+$, tetra-normal-butyl ammonium, or tetra-normal-butyl phosphonium are more preferable.

Specifically, the heteropoly acid compound includes heteropoly tungstic acid compound such as sodium tungstosilicicate, sodium phosphotungstate, ammonium phosphotungstate, tungstosilicic acid tetra-tetra-n-butyl phosphonium salt. In addition, the heteropoly acid compound includes heteropoly molybdic acid compound such as sodium phosphomolybdate, ammonium phosphomolybdate, phosphomolybdic acid tri-tetra-n-butyl ammonium salt. In addition, as the compound including a plurality of poly elements, phosphotungsten molybdic acid tri-tetra-n-ammonium salt or the like may be exemplified. Two kinds or more of these heteropoly acid and heteropoly acid compound may be mixed and used. Such heteropoly acid and heteropoly acid compound are easily dissolved in a solvent, and are stable in a battery, such that there is no adverse effect such as reaction with another material.

As described above, the heteropoly acid and the heteropoly acid compound contribute to the suppression of the generation of gas, or the like. Therefore, it is preferable that a gel-type film, more specifically a gel-type film derived from at least one of heteropoly acid and heteropoly acid compound be provided to at least one of the positive electrode 21 and the negative electrode 22. This gel-type film includes a precipitate that is formed in such a manner that during charge or preliminary charge, the heteropoly acid or heteropoly acid compound is electrolyzed and is precipitated in a three-dimensional network structure. That is, the gel-type film includes at least one between amorphous poly acid having one kind or more polyelements and poly acid salt compound, and the amorphous poly acid and the poly acid compound include an electrolytic solution and therefore become gelatinous. This film grows in a thickness direction, but it is difficult for the film to have an adverse effect conductivity of lithium ions. In addition, the film prevents a large current from flowing when the separator 23 comes into contact with the positive electrode 21 or the negative electrode 22, and therefore the film suppresses an instantaneous heat generation of a secondary battery. The gel-type film may be provided on at least a part of a surface of the positive electrode 21 or the like. In addition, the existence and composition of the gel-type film, or the like is confirmed through a scanning electron microscope (SEM), X-ray absorption fine structure (XAFS) analysis, a TOF-SIMS method, or the like.

In regard to the above-described gel-type film, it is preferable that at least a part of at least one of the poly acid and the poly acid compound in the negative electrode 22 be reduced and therefore a valence of a polyatom becomes less than hexa valence, and on the other hand, the reduction do not occur and therefore at least a part of the poly acid and the poly acid compound, which are present with a hexa valence as a valence of the polyatomic ion, be present concurrently. In this manner, a polyatomic ion that is in a reduced state, and a polyatomic ion that is in a non-reduced state are mixed, such that stability of the poly acid and the poly acid compound that have a gas-absorbing effect is increased, and therefore improvement in resistance against an electrolytic solution is anticipated. A reduced state of at least a part of the precipitated poly acid and poly acid compound may be confirmed through the XPS method. In this case, a battery is disassembled, and then is cleaned by dimethyl carbonate to remove a low-volatile solvent component and an electrolyte salt. It is preferable that sampling be performed under a nonactive atmosphere as possible. In addition, when the overlapping of peaks that belong to a plurality of energy levels is suspected, a waveform analysis is performed with respect to a measured spectrum to separate the peaks, and as a result thereof, it is possible to confirm whether a peak belonging to a tungsten or molybdenum ion with a hexa valence or a valence less than a hexa valence is present.

Operation of Secondary Battery

In this secondary battery, for example, during charge, lithium ions emitted from the positive electrode 21 are occluded in the negative electrode 22 through the electrolytic solution. In addition, for example, during discharge, lithium ions emitted from the negative electrode 22 are occluded in the positive electrode 21 through the electrolytic solution.

In this case, it is preferable that a charge voltage (positive electrode potential: vs lithium metal standard potential) during charge at the first time be set to a high voltage, and specifically, 4.4 V or more is preferable. This is because as described above, the generation reaction of the irreversible capacity in the negative electrode 22 is substantially completed during the charge of the first time. However, to suppress the decomposition reaction of the lithium composite oxide, it is preferable that the charge voltage during charge at the first time be not enormously high, and specifically, 4.6 V or less is preferable.

In addition, a charge voltage (positive electrode potential: vs lithium metal standard potential) during charge after the first time is not particularly limited, but it is preferable that this charge voltage be lower than the charge voltage during the charge of the first time, and specifically, be nearly 4.3 V. This is because lithium ions are smoothly emitted from a positive electrode active material to obtain a battery capacity, and a decomposition reaction of the electrolytic solution and a dissolution reaction of a separator are suppressed.

Method of Manufacturing Secondary Battery

This secondary battery is manufactured, for example, by the following sequence.

First, the positive electrode 21 is manufactured. At first, a positive electrode active material and a positive electrode binding agent, a positive electrode conducting agent, or the like, as necessary, are mixed to produce a positive electrode mixture. Then, this positive electrode mixture is dispersed in an organic solvent or the like and thereby a paste-type positive electrode mixture slurry is obtained. Subsequently, this positive electrode mixture slurry is applied onto both surfaces of the positive electrode current collector 21A and is dried, and thereby the positive electrode active material layer 21B is formed. Subsequently, the positive electrode current collector layer 21B is compression-molded by a roll pressing machine or the like while being heated according to necessity. In this case, this compression molding may be performed plural times.

Next, the negative electrode 22 is manufactured in the same sequence as that of the positive electrode 21. In this case, a negative electrode active material, and a negative electrode binding agent, a negative electrode conducting agent, or the like, as necessary, are mixed to produce a negative electrode mixture. Then, this negative electrode mixture is dispersed in an organic solvent or the like and thereby a paste-type negative electrode mixture slurry is obtained. Subsequently, this negative electrode mixture slurry is applied onto both surfaces of the negative electrode current collector 22A and is dried, and thereby the negative electrode active material layer 22B is formed. Then, the negative electrode active material layer 22B is compression-molded according to necessity.

In addition, the negative electrode 22 may be manufactured by a sequence different from the sequence in the positive electrode 21. In this case, for example, a negative electrode material is deposited on both surfaces of the negative electrode current collector 22A by using a vapor phase method such a deposition method, and thereby the negative electrode active material layer 22B is formed.

Finally, a secondary battery is assembled using the positive electrode 21 and the negative electrode 22. First, through a welding method or the like, the positive electrode lead 25 is attached to the positive electrode current collector 21A and the negative electrode lead 26 is attached to the negative electrode current collector 22A. Subsequently, the positive electrode 21 and the negative electrode 22 are laminated with the separator 23 interposed therebetween, and are wound to form the wound electrode body 20. Then, the center pin 24 is inserted into the wound electrode body 20 at the winding center thereof. Subsequently, the wound electrode body 20 is accommodated inside the battery casing 11 while being interposed between the pair of insulating plates 12 and 13. In this case, through a welding method or the like, a front end portion of the positive electrode lead 25 is attached to the safety valve mechanism 15 and a front end portion of the negative electrode lead 26 is attached to the battery casing 11. Subsequently, an electrolytic solution is injected into the inside of the battery casing 11, and is impregnated in the separator 23. Subsequently, the battery lid 14, the safety valve mechanism 15, and the PTC element 16 are caulked to an opening end portion of the battery casing 11 with the gasket 17 interposed therebetween.

Operation and Effect of Secondary Battery

According to this cylinder type secondary battery, in a case where the negative electrode active material layer 22B of the negative electrode 22 includes a metal-based material (material including at least one of silicon and tin as a constituent material), the positive electrode active material layer 21B of the positive electrode 21 includes the lithium composite oxide of the above-described composition. In this case, as described above, the crystalline structure of the lithium composite oxide becomes stabilized, such that it is easy for lithium ions to be stably occluded and emitted. In addition, when the charge voltage during charge at the first time is set to a high voltage, the irreversible capacity occurring at the negative electrode 22 is compensated. Therefore, the negative electrode active material has a property of increasing the irreversible capacity, such that even when a negative electrode active material having a noble electrode potential compared to a carbon material is used, a high discharge capacity can be obtained and even when charge and discharge are repeated, it is difficult for the discharge capacity to decrease, and as a result thereof, an excellent battery capacity characteristic and cycle characteristics may be obtained.

Specifically, when a covering layer, which covers at least a part of the surface and includes a third element as a constituent element, is provided on the surface of the lithium composite oxide, it is possible to further improve the cycle characteristics. When the constituent element of the lithium composite oxide is substituted with the third element, and a content of the third element in the lithium composite oxide is 0.01 to 5 mol % with respect to a content of the lithium, it is possible to obtain a relatively higher effect.

In addition, when at least one of the positive electrode 21, the negative electrode 22, and the electrolytic solution includes at least one kind of heteropoly acid and heteropoly acid compound which are expressed by equations (2) to (5), it is possible to suppress the swelling of a secondary battery.

1-2. Laminated Film Type

Figure 3:
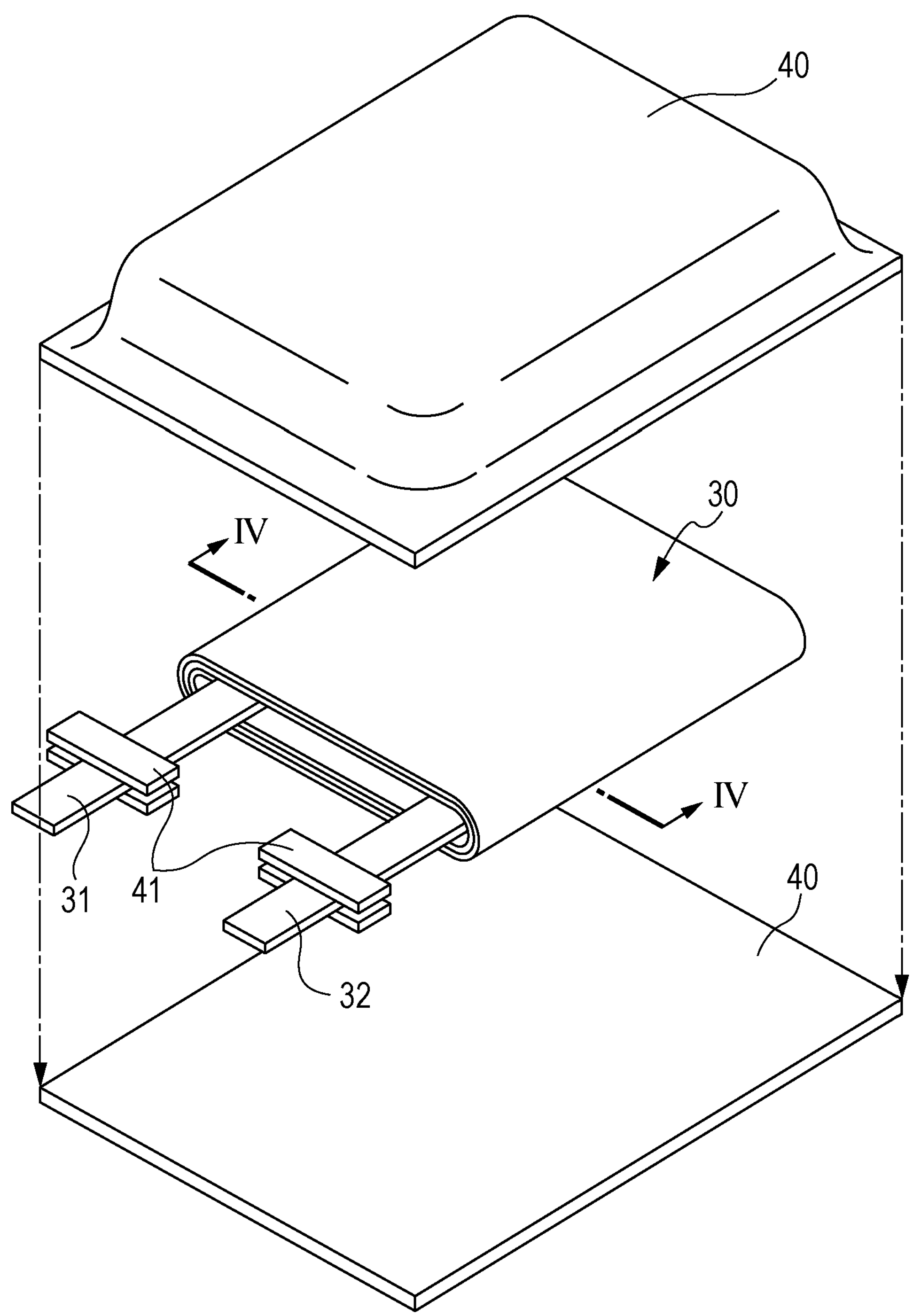
FIG. 3 is a perspective view illustrating a configuration of another lithium ion secondary battery (laminated film type) according to an embodiment of the present disclosure.
Figure 4:
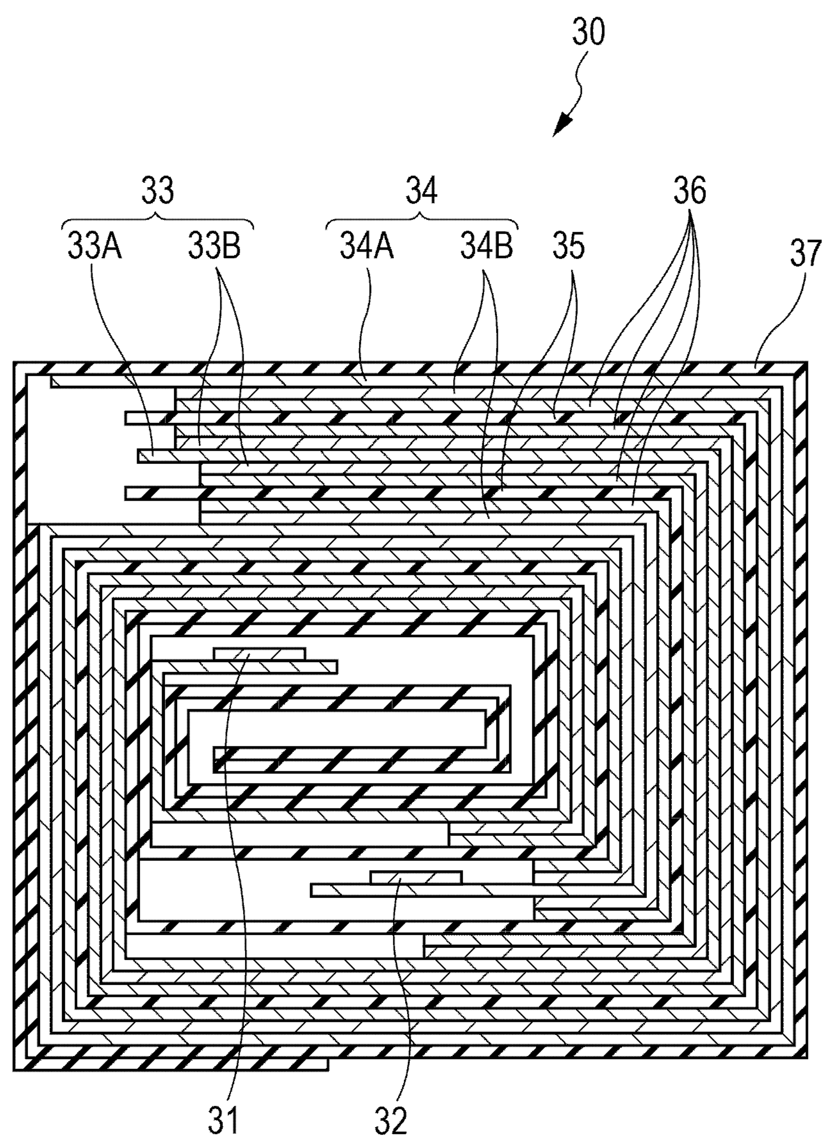
FIG. 4 is a cross-sectional view shown along a line IV-IV of the wound electrode body shown in FIG. 3.

FIG. 3 shows an exploded perspective view of another laminated film type lithium ion secondary battery according to an embodiment of the present disclosure, and FIG. 4 shows an exploded view taken along a line IV-IV of a wound electrode body 30 shown in FIG. 3. Hereinafter, components of the cylinder type lithium ion secondary battery described above will be referred to as necessary.

Entire Configuration of Secondary Battery

This secondary battery has a main configuration in which the wound electrode body 30 is accommodated in a film-shaped exterior member 40, that is, a so-called laminated film type. This wound electrode body 30 is configured in such a manner that a positive electrode 33 and a negative electrode 34 are laminated with a separator 35 and an electrolyte layer 36 interposed therebetween and this laminated body is wound. A positive electrode lead 31 is attached to the positive electrode 33, and a negative electrode lead 32 is attached to the negative electrode 34. The outermost peripheral portion of the wound electrode body 30 is protected by a protective tape 37.

For example, the positive electrode lead 31 and the negative electrode lead 32 lead out from the inside of the exterior member 40 toward the outside in the same direction. The positive electrode lead 31 is formed of, for example, a conductive material such as aluminum, and the negative electrode lead 32 is formed of, for example, a conductive material such as copper, nickel, or stainless steel. This material has, for example, a thin plate shape or a network shape.

The exterior member 40 is a laminated film in which, for example, a fusion layer, a metallic layer, and a surface protecting layer are laminated in this order. In this laminated film, for example, fusion layers of two sheets of films are adhered to each other in an external periphery through a fusion or by an adhesive or the like in such a manner that the fusion layer is opposite to the wound electrode body 30. The fusion layer is formed of, for example, a film of polyethylene, polypropylene, or the like. The metallic layer is formed of, for example, aluminum foil. The surface protecting layer is formed of, for example, a film of nylon, polyethylene terephthalate, or the like.

Among these, as the exterior member 40, an aluminum laminated film in which the polyethylene film, aluminum foil, and the nylon film are laminated in this order is preferable. However, the exterior member 40 may be formed by a laminated film having another lamination structure, a polymer film such as polypropylene, or a metallic film.

An adhesive film 41 is inserted between the exterior members 40 and the positive electrode lead 31 and the negative electrode lead 32 to prevent the penetration of outside air. This adhesive film 41 is formed of a material having an adhesion property with respect to the positive electrode lead 31 and the negative electrode lead 32. As this material, a polyolefin resin such as polyethylene, polypropylene, modified polyethylene, modified polypropylene, or the like may be exemplified.

The positive electrode 33 includes a positive electrode current collector 33A and a positive electrode active material layer 33B provided on both surfaces of the positive electrode current collector 33A. The negative electrode 34 includes a negative electrode current collector 34A and a negative electrode active material layer 34B provided on both surfaces of the negative electrode current collector 34A. The configurations of the positive electrode current collector 33A, the positive electrode active material layer 33B, the negative electrode current collector 34A, and the negative electrode active material layer 34B are the same as those of the positive electrode current collector 21A, the positive electrode active material layer 21B, the negative electrode current collector 22A, and the negative electrode active material layer 22B. In addition, a configuration of the separator 35 is the same as that of the separator 23.

In the electrolyte layer 36, an electrolytic solution formed of a polymer compound is maintained, and the electrolyte layer 36 may include another material such as an addictive if necessary. This electrolyte layer 36 is a so-called gel type electrolyte. This is because high ion conductivity (for example, 1 mS/cm or more at room temperature) may be obtained and a leakage of the electrolytic solution is prevented.

The polymer compound includes any one kind or two kinds or more of the following polymer materials or the like: polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polyacrylate, polymethacrylate, styrene-butadiene rubber, nitrile butadiene rubber, polystyrene, polycarbonate, and a copolymer of vinylidene fluoride and hexafluoropyrene. Among these, polyvinylidene fluoride or the copolymer of vinylidene fluoride and hexafluoropyrene are preferable. This is because these are electrochemically stable.

A composition of the electrolytic solution is the same as that of the electrolyte described with respect to the cylinder type. However, in regard to the electrolyte layer 36 that is a gel-type electrolyte, the nonaqueous solvent of the electrolytic solution includes not only a liquid solvent but also a material having an ion conductivity that can dissociate the electrolyte salt. Therefore, in the case of using the polymer compound having the ion conductivity, the polymer compound is also included in the solvent.

In addition, instead of the gel-type electrolyte layer 36, the electrolytic solution may be used as is. In this case, the electrolytic solution is impregnated in the separator 35.

Operation of Secondary Battery

In this secondary battery, for example, during charge, lithium ions emitted from the positive electrode 33 are occluded in the negative electrode 34 through the electrolyte layer 36. In addition, for example, during discharge, lithium ions emitted from the negative electrode 34 are occluded in the positive electrode 33 through the electrolyte layer 36. In this case, since the generation reaction of the irreversible capacity in the negative electrode 34 is substantially completed during charge at the first time, it is preferable that the charge voltage during charge at the first time be higher than the charge voltage during charge after the first time.

Method of Manufacturing Secondary Battery

The secondary battery including the gel-type electrolyte layer 36 is manufactured, for example, in the following three kinds of sequences.

In a first sequence, first, the positive electrode 33 and the negative electrode 34 are manufactured by the same sequence of the positive electrode 21 and the negative electrode 22. In this case, the positive electrode active material layer 33B is formed at both surfaces of the positive electrode current collector 33A and thereby the positive electrode 33 is manufactured, and the negative electrode active material layer 34B is formed at both surfaces of the negative electrode current collector 34A, and thereby the negative electrode 34 is manufactured. Subsequently, a precursor solution including an electrolytic solution, a polymer compound, and a solvent such as an organic solvent is prepared. This precursor solution is applied on the positive electrode 33 and the negative electrode 34, and thereby the gel-type electrolyte layer 36 is formed. Subsequently, through a welding method or the like, the positive electrode lead 31 is attached to the positive electrode current collector 33A through a welding or the like, and the negative electrode lead 32 is attached to the negative electrode current collector 34A. Subsequently, the positive electrode 33 and the negative electrode 34 to which the electrolyte layer 36 is provided, respectively, are laminated with the separator 35 interposed therebetween, and are wound to form the wound electrode body 30. Then, a protective tape 37 is adhered to the outermost peripheral portion of the wound electrode body 30. Subsequently, the wound electrode body 30 is interposed between two sheets of film-shaped exterior members 40 and the peripheries of the exterior members 40 are bonded to each other through a thermal fusion method or the like to seal the wound electrode body 30. In this case, an adhesive film 41 is interposed between the positive electrode and negative electrode leads 31 and 32 and the exterior members 40.

In a second sequence, first, the positive electrode lead 31 is attached to the positive electrode 33, and the negative electrode lead 32 is attached to the negative electrode 34. Subsequently, the positive electrode 33 and the negative electrode 34 are laminated with the separator 35 interposed therebetween and this laminated body is wound to manufacture a wound body that is a precursor of the wound electrode body 30. Then, the protective tape 37 is adhered to the outermost peripheral portion of the wound body. Subsequently, the wound body is interposed between two sheets of film-shaped exterior members 40 and the peripheries of the exterior members 40 are bonded to each other through a thermal fusion method or the like with one side left to accommodate the wound electrode body 30 in the exterior members 40 having a bag shape. Subsequently, an electrolyte composition including an electrolytic solution, monomers that are a raw material of a polymer compound, a polymerization initiating agent, and other material such as a polymerization prohibiting agent according to necessity is prepared, and this electrolyte composition is injected into the bag-shaped exterior members 40. An opening portion of the exterior members 40 is sealed through a thermal fusion method or the like. Subsequently, the monomers are thermally polymerized. In this manner, a polymer compound is formed, and therefore the gel-type electrolyte layer 36 is formed.

In a third sequence, first, a wound body is manufactured in the same sequence as that in the second sequence except that the separator 35 to which a polymer compound is applied on both surfaces thereof is used. Then, the wound body is accommodated in the bag-shaped exterior members 40. As the polymer compound applied to the separator 35, a polymer (homopolymer, copolymer, multi-component copolymer, or the like) including vinylidene fluoride as a component may be exemplified. Specifically, polyvinylidene fluoride, a binary copolymer including vinylidene fluoride and hexafluoropropylene as a component, a ternary copolymer including vinylidene fluoride, hexafluoropropylene, and chlorotrifluoroethylene as a component, or the like may be exemplified. In addition, another one kind or two kinds or more of polymer compounds may be used together with a polymer including vinylidene fluoride as a component. Consequently, an electrolytic solution is prepared and is injected into the inside of the exterior members 40. Then, the opening portion of the exterior members 40 is sealed through a thermal fusion method or the like. Consequently, the exterior members 40 are heated while a load is applied thereto, and the separator 35 is brought into close contact with the positive electrode 33 and the negative electrode 34 with a polymer compound interposed therebetween. In this manner, the electrolytic solution is impregnated in the polymer compound, and gelation occurs in the polymer compound and thereby the electrolyte layer 36 is formed.

In this third sequence, swelling of the secondary battery is suppressed compared to the first sequence. In addition, in this third sequence, almost none of the monomer, the solvent, or the like that are raw materials of the polymer compound remain in the electrolyte layer 36 compared to the second sequence, such that a forming process of the polymer compound may be effectively controlled. Therefore, it is possible to obtain a sufficient adhesion property between the positive electrode 33, the negative electrode 34, and the separator 35, and the electrolyte layer 36.

Operation and Effect of Secondary Battery

According to this laminated film type secondary battery, in a case where the negative electrode active material layer 34B of the negative electrode 34 includes a metal-based material (material including at least one of silicon and tin as a constituent material) as a negative electrode active material, the positive electrode active material layer 33B of the positive electrode 33 includes the lithium composite oxide of the above-described composition. Therefore, an excellent battery capacity and cycle characteristics may be obtained from the same reason as that in the cylinder type. Other operations and effects are the same as those in the cylinder type.

2. Use of Lithium Ion Secondary Battery

Next, an application example of the above-described lithium ion secondary battery will be described.

The use of the secondary battery is not particularly limited as long as this secondary battery can be used as a power source for driving or a power storage source for storing power in a machine, an apparatus, instrument, a device, or a system (assembly of a plurality of apparatuses or the like). In a case where the secondary battery is used as a power source, the power source may be a main power source (a power source that is preferentially used), or an auxiliary power source (a power source that is used instead of the main power source, or a power source that is used by being switched from the main power source). In the latter case, the main power source is not limited to the secondary battery.

As the use of the secondary battery, for example, the following uses or the like may be exemplified: a portable electronic apparatus such as a video camera, a digital still camera, a mobile telephone, a notebook PC, a wireless telephone, a headphone stereo, a portable radio, a portable television, and a portable PDA (personal digital assistant), a household electric apparatus such as an electric shaver, a storage device such as a backup power source and a memory card, an electric tool such as an electric drill and an electric slicer, a medical electronic apparatus such as a pacemaker or a hearing aid, an electric vehicle (including a hybrid vehicle), and a power storage system such as a household battery system that stores power for an emergency.

Among these, the secondary battery is effective for the application to the electric tool, the electric vehicle, the power storage system, or the like. This is because excellent characteristics are necessary for the secondary battery, and it is possible to effectively realize an improvement in characteristics by using the secondary battery according to an embodiment of the present disclosure. In addition, in regard to the electric tool, a moving part (for example, a drill or the like) is driven by using the secondary battery as a driving power source. The electric vehicle operates (runs) by using the secondary battery as a driving power source, and may be a vehicle (a hybrid vehicle or the like) that is also provided with another driving source in addition to the secondary battery. The power storage system is a system using the secondary battery as a power storage source. For example, in a household power storage system, power is stored in the secondary battery that is a power storage source and the power stored in the secondary battery is consumed according to necessity, and various apparatuses such as household electric products may use the power storage system.

EXAMPLES

Hereinafter, specific examples of the present disclosure will be described.

Experiment Examples 1-1 to 1-25

Synthesis of Positive Electrode Active Material

A positive electrode active material was obtained by the following sequence. First, lithium carbonate ($Li_2CO_3$), manganese carbonate ($MnCO_3$), nickel hydroxide ($Ni(OH)_2$), cobalt hydroxide ($Co(OH)_2$), aluminum nitrate enneahydrate ($Al(NO_3)_3.9H_2O$) as raw materials were mixed, and then was sufficiently mixed and crushed using a mechanochemical (MC) method. In this case, a ball mill using water as a dispersion medium was used as the MC method. In addition, a mixing ratio of raw materials was adjusted such that a composition (mole ratio of Li and the first and second elements M1 and M2) of an obtained lithium composite oxide was set to values shown in Table 1. Consequently, the obtained mixture was baked at a high temperature of 850° C. for 12 hours to synthesize a lithium composite oxide $Li_{1.13}(Mn_{0.6}Ni_{0.2}Co_{0.2})_{0.87}Al_{0.01}O_2$ that includes manganese, nickel, and cobalt as a first element M1, and aluminum as a second element M2, respectively.

Furthermore, a series of positive electrode active materials were obtained in the same sequence except that as shown in Tables 1 and 2, a titanium dioxide ($TiO_2$), magnesium oxalate ($MgC_2O_4.2H_2O$), boron oxide ($B_2O_3$) as raw materials were added and the composition of the lithium composite oxide was changed depending on the mixing ratio of the raw materials.

In addition, according to necessity, as shown in Table 2, a series of positive electrode active materials were obtained in the same sequence except that a method of forming the lithium composite oxide was changed and a covering layer including a third element M3 was formed on a surface of the lithium composite oxide.

In a case where a coprecipitation method was used as a method of forming the lithium composite oxide, nickel sulfate ($NiSO_4$), cobalt sulfate ($CoSO_4$), manganese sulfate ($MnSO_4$), sodium aluminate ($NaAlO_2$) as raw materials were mixed and dissolved in water. Then, sodium hydrate (NaOH) was added to this dissolved material while being sufficiently agitated and as a result thereof, a complex coprecipitated hydrate of manganese, nickel, cobalt, and aluminum. In this case, a mixing ration of raw materials was adjusted such that a mole ratio of manganese, nickel, and cobalt satisfies a relationship of Mn:Ni:Co=60:20:20, and a mole ratio of aluminum, manganese, nickel, and cobalt satisfies a relationship of Al:(Mn+Ni+Co)=1:86. Consequently, the coprecipated material was cleaned with water and was dried, and then sodium hydroxide monohydrate salt was added to the resultant dried material, and as a result thereof a precursor was obtained. In this case, a mixing ratio was adjusted such that a mole ratio of lithium, and the sum of manganese, nickel, cobalt, and aluminum satisfies a relationship of Li:(Mn+Ni+Co+Al)=113:87. Consequently, the precursor was baked at a high temperature of 850° C. for 12 hours, and then was cooled to room temperature. Then, the resultant cooled material was crushed and as a result thereof lithium composite oxide ($Li_{1.13}(Mn_{0.6}Ni_{0.2}Co_{0.2})_{0.87}Al_{0.01}O_2$) was obtained. A particle size of the lithium composite oxide was measured by using a laser scattering method, and a mean particle size was 11 μm.

In a case where a covering layer was formed on a surface of the lithium composite oxide, the weighting of magnesium phosphate as a compound including a third element M3 was performed such that a mole ratio of Li:Mg=100:1 was satisfied with respect to the lithium composite oxide synthesized using the MC method and then the mixing was performed. Consequently, the resultant mixture was processed using a mechanochemical apparatus for one hour, and as a result thereof, magnesium phosphate was deposited on a surface of the lithium composite oxide. Consequently, the resultant deposited material was baked at a high temperature of 900° C. for three hours after a temperature rising at a velocity of 3° C. per minute. As a result thereof, a lithium composite oxide in which the third element M3 (magnesium) was taken in the surface region was obtained. A content of the third element M3 was 1 mol % with respect to a content of lithium.

Manufacturing of Secondary Battery

To investigate battery performance using the above-described positive electrode active material, a laminated film type lithium ion secondary battery shown in FIGS. 3 and 4 was manufactured.

First, a positive electrode 33 was manufactured. As shown in Tables 1 and 2, 90 parts by mass of a positive electrode active material, 5 parts by mass of positive electrode binding agent (PVDF: polyvinylidene difluoride), and 5 part by mass of a positive electrode conducting agent (ketjen black that is an amorphous carbon powder) were mixed to obtain a positive electrode mixture. Consequently, the positive electrode mixture was dispersed in N-methyl-2-pyrolidone (NMP) and as a result thereof, a positive electrode mixture slurry was obtained. Consequently, the positive electrode mixture slurry was uniformly applied on both surfaces of a positive electrode current collector 33A (aluminum foil: thickness=15 μm) and then was dried using warm air, and as a result thereof, a positive electrode active material layer 33B was formed. Consequently, this positive electrode active material layer 33B was compression-molded using a roll pressing machine and then was cut into a strip shape (48 mm×300 mm).

Next, a negative electrode 34 was manufactured, As shown in Tables 1 and 2, a negative electrode active material and 20 wt % NMP solution of polyimide were mixed in a mass ratio of 7:2, and as a result thereof a negative electrode mixture slurry was obtained. As this negative electrode active material, an elementary substance of silicon (median size is 10 μm), an elementary substance of tin (median size is 10 μm), and a silicon oxide (SiO: median size is 7 μm) were used. Consequently, the negative electrode mixture slurry was applied onto both surfaces of a negative electrode current collector 34A (copper foil: thickness=15 μm) by using a bar coater (gap=35 μm) and then was dried at 80° C. Then, the resultant dried material was compression-molded by using a roll pressing machine and was heated at 700° C. for three hours to form a negative electrode active material layer 34B. Finally, the negative electrode active material layer 34B was cut into a strip shape (50 mm×310 mm).

Next, an electrolytic solution was prepared. Ethylene carbonate (EC) and ethylmethyl carbonate (EMC) that serve as a solvent were mixed, and then lithium hexafluorophosphate ($LiPF_6$) as electrolyte salt was dissolved in the solvent. In this case, a composition (mass ratio) of the solvent was set to satisfy a relationship of EC:EMC=50:50, and a content of the electrolyte salt with respect to the solvent was set to 1 mol/$dm^3$ (=1 mol/l). In addition, according to necessity, tungstosilicic acid (0.5 wt %) that is heteropoly acid was added to the electrolytic solution.

Finally, a secondary battery was assembled using the positive electrode 33 and the negative electrode 34. In this case, a positive electrode lead 25 formed of aluminum was welded to the positive electrode current collector 33A of the positive electrode 33, and a negative electrode lead 26 formed of copper was welded to the negative electrode current collector 34A of the negative electrode 34. Consequently, the positive electrode 33 and the negative electrode 34 were laminated with a separator 35 (minutely porous polyethylene film: thickness=25 μm) interposed therebetween, and this laminated body was wound in a longitudinal direction to obtain a wound electrode body 30. A protective tape 37 was adhered to the outermost periphery of this wound electrode body 30. Consequently, the wound electrode body 30 was interposed between two sheets of film-type exterior members 40, and the peripheries of the exterior members 40 were thermally fused to each other at three sides to form a bag shape. As the exterior members 40, an aluminum laminated film having moisture resistance in which a nylon film (thickness=25 μm), aluminum foil (thickness=40 μm), and a polypropylene film (thickness=30 μm) were laminated in this order from an external side was used. Consequently, the electrolytic solution was injected into the inside of the exterior members 40 and was impregnated in the separator 35, and then the remaining one side of the exterior members 40 was thermally fused under a decompressed environment.

Measurement of Battery Performance

A battery capacity characteristic, cycle characteristics, and a swelling characteristic were investigated using the above-described laminated film type secondary battery, and the results shown in Tables 1 and 2 were obtained.

In a case where the battery capacity characteristic and the cycle characteristics were investigated, a discharge capacity (a discharge capacity of a second cycle) and a capacity maintaining ratio (a capacity maintaining ratio after 300 cycles) were obtained. A secondary battery was charged and discharged with two cycles under a circumstance of 23° C., and the discharge capacity (mAh) of the second cycle was measured. Consequently, the secondary battery was subjected to a charge and discharge until the sum of cycle numbers reaches 300 times, and a discharge capacity (mAh) of a $300^{th}$ cycle was measured. From these results, a capacity maintaining ratio (%) of (the discharge capacity of the $300^{th}$ cycle)/the discharge capacity of the second cycle)×100 was calculated. In addition, during charge and discharge of a first cycle, a constant current charge was performed until a battery voltage reaches 4.5 V with a current of 0.2 C, a constant voltage charge was performed until a current value decreases to 0.01 C with a constant voltage of 4.5 V, and a constant current charge was performed until a battery voltage reaches 2.5 V with a current of 0.1 C. During charge and discharge after the second cycle, charge and discharge was performed under the same conditions as those in the first cycle except that a target battery voltage during the constant current charge was changed to 4.25 V. 0.2C, 0.01C, and 0.1C represent current values with which the battery capacity is discharged within 5 hours, 100 hours, and 10 hours, respectively. In addition, discharge capacity shown in tables 1 and 2 is a value obtained by standardizing a discharge capacity in the following experiment example 2-1 to 100.

In the case of investigating the swelling characteristic, a thickness (mm) of the secondary battery before charge and discharge was measured, the secondary battery was subjected to a charge and discharge of a first cycle, and then a thickness (mm) after charge and discharge was measured. From this result, a swelling amount (mm)=the thickness after charge and discharge—the thickness before charge and discharge was obtained. In addition, charge and discharge conditions were the same as those at the first cycle in the case of investigating the battery capacity characteristic or the like.

TABLE 1

| | Positive electrode | | | | | | | | | Negative electrode | | | |
|---|---|---|---|---|---|---|---|---|---|---|---|---|---|
| | Positive electrode active material | | | | | | | | | Negative | Discharge | Discharge | Swell- |
| | M2-Containing lithium composite oxide($Li_aM1_bM2_cO_d$) | | | | | | | | | electrode | capacity | capacity | ing |
| Table 1 | M1 | M2 | a | b | c | d | Forming method | M3 | Addic-tive | active material | (Standardized) | maintaining ratio (%) | amount (mm) |
| Experiment Example 1-1 | $Mn_{0.6}Ni_{0.2}Co_{0.2}$ | Al | 1.13 | 0.86 | 0.01 | 2 | MC method | — | — | SiO | 111 | 78 | 19.3 |
| Experiment Example 1-2 | $Mn_{0.6}Ni_{0.2}Co_{0.2}$ | Al | 1.13 | 0.84 | 0.03 | 2 | MC method | — | — | SiO | 110 | 80 | — |
| Experiment Example 1-3 | $Mn_{0.6}Ni_{0.2}Co_{0.2}$ | Al | 1.13 | 0.82 | 0.05 | 2 | MC method | — | — | SiO | 109 | 82 | — |
| Experiment Example 1-4 | $Mn_{0.6}Ni_{0.2}Co_{0.2}$ | Al | 1.13 | 0.78 | 0.09 | 2 | MC method | — | — | SiO | 107 | 83 | — |
| Experiment Example 1-5 | $Mn_{0.6}Ni_{0.2}Co_{0.2}$ | Al | 1.25 | 0.74 | 0.01 | 2 | MC method | — | — | SiO | 110 | 80 | — |
| Experiment Example 1-6 | $Mn_{0.6}Ni_{0.2}Co_{0.2}$ | Al | 1.25 | 0.72 | 0.03 | 2 | MC method | — | — | SiO | 109 | 82 | — |
| Experiment Example 1-7 | $Mn_{0.6}Ni_{0.2}Co_{0.2}$ | Al | 1.25 | 0.7 | 0.05 | 2 | MC method | — | — | SiO | 108 | 84 | — |
| Experiment Example 1-8 | $Mn_{0.6}Ni_{0.2}Co_{0.2}$ | Al | 1.25 | 0.66 | 0.09 | 2 | MC method | — | — | SiO | 106 | 85 | — |
| Experiment Example 1-9 | $Mn_{0.6}Ni_{0.2}Co_{0.2}$ | Al | 1.11 | 0.88 | 0.01 | 2 | MC method | — | — | SiO | 108 | 78 | — |
| Experiment Example 1-10 | $Mn_{0.6}Ni_{0.2}Co_{0.2}$ | Al | 1.11 | 0.86 | 0.03 | 2 | MC method | — | — | SiO | 107 | 80 | — |
| Experiment Example 1-11 | $Mn_{0.6}Ni_{0.2}Co_{0.2}$ | Al | 1.11 | 0.84 | 0.05 | 2 | MC method | — | — | SiO | 106 | 82 | — |
| Experiment Example 1-12 | $Mn_{0.6}Ni_{0.2}Co_{0.2}$ | Al | 1.11 | 0.8 | 0.09 | 2 | MC method | — | — | SiO | 104 | 83 | — |

TABLE 2

| | Positive electrode | | | | | | | | | Negative electrode | | | |
|---|---|---|---|---|---|---|---|---|---|---|---|---|---|
| | Positive electrode active material | | | | | | | | | Negative | Discharge | Discharge | Swell- |
| | M2-Containing lithium composite oxide($Li_aM1_bM2_cO_d$) | | | | | | | | | electrode | capacity | capacity | ing |
| Table 2 | M1 | M2 | a | b | c | d | Forming method | M3 | Addi-tive | Active material | (standardized) | maintaining ratio (%) | amount (mm) |
| Experiment Example 1-13 | $Mn_{0.6}Ni_{0.25}Co_{0.15}$ | Al | 1.13 | 0.86 | 0.01 | 2 | MC method | — | — | SiO | 112 | 78 | — |
| Experiment Example 1-14 | $Mn_{0.6}Ni_{0.1}Co_{0.3}$ | Al | 1.13 | 0.86 | 0.01 | 2 | MC method | — | — | SiO | 108 | 78 | — |
| Experiment Example 1-15 | $Mn_{0.65}Ni_{0.35}$ | Al | 1.13 | 0.86 | 0.01 | 2 | MC method | — | — | SiO | 109 | 78 | — |

TABLE 2-continued

| Table 2 | Positive electrode — Positive electrode active material — M2-Containing lithium composite oxide($Li_aM1_bM2_cO_d$) M1 | M2 | a | b | c | d | Forming method | M3 | Additive | Negative electrode — Negative electrode Active material | Discharge capacity (standardized) | Discharge capacity maintaining ratio (%) | Swelling amount (mm) |
|---|---|---|---|---|---|---|---|---|---|---|---|---|---|
| Experiment Example 1-16 | $Mn_{0.65}Co_{0.35}$ | Al | 1.13 | 0.86 | 0.01 | 2 | MC method | — | — | SiO | 106 | 78 | — |
| Experiment Example 1-17 | $Mn_{0.6}Ni_{0.2}Co_{0.2}$ | Ti | 1.13 | 0.77 | 0.09 | 2 | MC method | — | — | SiO | 107 | 80 | — |
| Experiment Example 1-18 | $Mn_{0.6}Ni_{0.2}Co_{0.2}$ | Mg | 1.13 | 0.77 | 0.09 | 2 | MC method | — | — | SiO | 107 | 79 | — |
| Experiment Example 1-19 | $Mn_{0.6}Ni_{0.2}Co_{0.2}$ | B | 1.13 | 0.77 | 0.09 | 2 | MC method | — | — | SiO | 107 | 78 | — |
| Experiment Example 1-20 | $Mn_{0.6}Ni_{0.2}Co_{0.2}$ | Al + Ti | 1.13 | 0.77 | 0.05 + 0.04 | 2 | MC method | — | — | SiO | 109 | 81 | — |
| Experiment Example 1-21 | $Mn_{0.6}Ni_{0.2}Co_{0.2}$ | Al | 1.13 | 0.86 | 0.01 | 2 | Coprecipitation method | — | — | SiO | 113 | 80 | — |
| Experiment Example 1-22 | $Mn_{0.6}Ni_{0.2}Co_{0.2}$ | Al | 1.13 | 0.86 | 0.01 | 2 | MC method | — | — | Si | 122 | 71 | — |
| Experiment Example 1-23 | $Mn_{0.6}Ni_{0.2}Co_{0.2}$ | Al | 1.13 | 0.86 | 0.01 | 2 | MC method | — | — | Sn | 106 | 70 | — |
| Experiment Example 1-24 | $Mn_{0.6}Ni_{0.2}Co_{0.2}$ | Al | 1.13 | 0.86 | 0.01 | 2 | MC method | Mg | — | SiO | 110 | 82 | — |
| Experiment Example 1-25 | $Mn_{0.6}Ni_{0.2}Co_{0.2}$ | Al | 1.13 | 0.86 | 0.01 | 2 | MC method | — | SCA | SiO | 110 | 80 | 5.19 |

Experiments 2-1 to 2-23

A positive electrode active material was synthesized and a secondary battery was manufactured in the same sequence as that in the experiment examples 1-1 to 1-25 except that a composition of the positive electrode active material and a kind of the negative electrode active material were changed as shown in tables 3 and 4 for comparison. As the negative electrode active material, mesocarbon microbeads (MCMB) that is a carbon material was used. Battery performances of this secondary battery were investigated and the results shown in Tables 3 and 4 were obtained.

TABLE 3

| Table 3 | Positive electrode — Positive electrode active material (M2-Containing lithium composite oxide: $Li_aM1_bM2_cO_d$) M1 | M2 | a | b | c | d | Forming method | Negative electrode — Negative electrode active material | Discharge capacity (standardized) | Discharge capacity maintaining ratio (%) |
|---|---|---|---|---|---|---|---|---|---|---|
| Experiment Example 2-1 | $Mn_{0.6}Ni_{0.2}Co_{0.2}$ | — | 1 | 1 | 0 | 2 | MC method | SiO | 100 | 64 |
| Experiment Example 2-2 | $Mn_{0.6}Ni_{0.2}Co_{0.2}$ | — | 1.13 | 0.87 | 0 | 2 | MC method | SiO | 110 | 65 |
| Experiment Example 2-3 | $Mn_{0.6}Ni_{0.2}Co_{0.2}$ | Al | 1.13 | 0.77 | 0.1 | 2 | MC method | SiO | 92 | 84 |
| Experiment Example 2-4 | $Mn_{0.6}Ni_{0.2}Co_{0.2}$ | Al | 1.13 | 0.67 | 0.2 | 2 | MC method | SiO | 90 | 85 |
| Experiment Example 2-5 | $Mn_{0.6}Ni_{0.2}Co_{0.2}$ | Al | 1.11 | 0.79 | 0.1 | 2 | MC method | SiO | 91 | 83 |
| Experiment Example 2-6 | $Mn_{0.6}Ni_{0.2}Co_{0.2}$ | Al | 1.25 | 0.65 | 0.1 | 2 | MC method | SiO | 89 | 85 |
| Experiment Example 2-7 | $Mn_{0.6}Ni_{0.2}Co_{0.2}$ | Al | 1 | 0.97 | 0.03 | 2 | MC method | SiO | 96 | 68 |
| Experiment Example 2-8 | $Mn_{0.6}Ni_{0.2}Co_{0.2}$ | Al | 1.1 | 0.87 | 0.03 | 2 | MC method | SiO | 101 | 70 |
| Experiment Example 2-9 | $Mn_{0.6}Ni_{0.2}Co_{0.2}$ | Al | 1.3 | 0.67 | 0.03 | 2 | MC method | SiO | 90 | 68 |
| Experiment Example 2-10 | $Mn_{0.6}Ni_{0.2}Co_{0.2}$ | Ti | 1.13 | 0.77 | 0.1 | 2 | MC method | SiO | 91 | 82 |
| Experiment Example 2-11 | $Mn_{0.6}Ni_{0.2}Co_{0.2}$ | Mg | 1.13 | 0.77 | 0.1 | 2 | MC method | SiO | 89 | 80 |
| Experiment Example 2-12 | $Mn_{0.6}Ni_{0.2}Co_{0.2}$ | B | 1.13 | 0.77 | 0.1 | 2 | MC method | SiO | 86 | 90 |
| Experiment Example 2-13 | $Mn_{0.6}Ni_{0.2}Co_{0.2}$ | Al + Ti | 1.13 | 0.77 | 0.05 + 0.05 | 2 | MC method | SiO | 90 | 83 |
| Experiment Example 2-14 | $Mn_{0.6}Ni_{0.2}Co_{0.2}$ | — | 1.1 | 0.9 | 0 | 2 | MC method | SiO | 102 | 66 |
| Experiment Example 2-15 | $Mn_{0.6}Ni_{0.2}Co_{0.2}$ | — | 1.3 | 0.7 | 0 | 2 | MC method | SiO | 91 | 66 |

TABLE 4

| Table 4 | Positive electrode Positive electrode active material (M2-Containing lithium composite oxide: $Li_aM1_bM2_cO_d$) M1 | M2 | a | b | c | d | Forming method | Negative electrode Negative electrode active material | Discharge capacity (standardized) | Discharge capacity maintaining ratio (%) |
|---|---|---|---|---|---|---|---|---|---|---|
| Experiment Example 2-16 | $Mn_{0.6}Ni_{0.2}Co_{0.2}$ | — | 1.13 | 0.87 | 0 | 2 | MC method | C | 90 | 84 |
| Experiment Example 2-17 | $Mn_{0.6}Ni_{0.2}Co_{0.2}$ | Al | 1.13 | 0.86 | 0.01 | 2 | MC method | C | 90 | 84 |
| Experiment Example 2-18 | $Mn_{0.6}Ni_{0.2}Co_{0.2}$ | Al | 1.13 | 0.82 | 0.05 | 2 | MC method | C | 89 | 84 |
| Experiment Example 2-19 | $Mn_{0.6}Ni_{0.2}Co_{0.2}$ | Al | 1.13 | 0.78 | 0.09 | 2 | MC method | C | 84 | 85 |
| Experiment Example 2-20 | $Mn_{0.6}Ni_{0.2}Co_{0.2}$ | Al | 1.13 | 0.67 | 0.2 | 2 | MC method | C | 80 | 85 |
| Experiment Example 2-21 | $Mn_{0.6}Ni_{0.2}Co_{0.2}$ | Ti | 1.13 | 0.78 | 0.09 | 2 | MC method | C | 83 | 84 |
| Experiment Example 2-22 | $Mn_{0.6}Ni_{0.2}Co_{0.2}$ | Mg | 1.13 | 0.78 | 0.09 | 2 | MC method | C | 83 | 85 |
| Experiment Example 2-23 | $Mn_{0.6}Ni_{0.2}Co_{0.2}$ | B | 1.13 | 0.78 | 0.09 | 2 | MC method | C | 81 | 84 |

In a case where the carbon material was used as the negative electrode active material, even when the lithium composite oxide was used as the positive electrode active material, the discharge capacity was not changed and the capacity maintaining ratio was not increased so much. On the contrary, in a case where a metal-based material was used as the negative electrode active material, when the lithium composite oxide was used as the positive electrode active material and the lithium composite oxide had a predetermined composition, the capacity maintaining ratio was significantly increased. This characteristic was obtained regardless of the kind of the metal-based material and the method of forming the lithium composite oxide.

From the above-described results, it can be seen that a special function of the lithium composite oxide that contributes to the discharge capacity and the capacity maintaining ratio were not revealed in the case of using the carbon material as the negative electrode active material, but specifically revealed in the case of using the metal-based material. That is, it can be seen that when the lithium composite oxide was not used in combination with the metal-based material, the advantages that the discharge capacity and the capacity maintaining ration were not improved.

This reason is considered to be as described below. When the carbon material was used, the discharge potential thereof was lower than that of the metal-based material such as silicon, and in the case of a high voltage charge, a potential of the positive electrode active material was also low, such that the positive electrode active material was apt to deteriorate. In this case, a special function of the lithium composite oxide was not revealed, such that a variation in the battery performance was almost not observed. On the contrary, in the case of using the metal-based material, the discharge potential thereof was also high in the carbon material, such that in a high potential, the positive electrode active material was originally apt to deteriorate. In this case, in the lithium composite oxide, a special function of suppressing the deterioration of the positive electrode active material under a difficult condition was revealed, such that a significant variance in the battery performance was observed.

In addition to this, when a covering layer including the third element M3 was provided on a surface of the lithium composite oxide, the capacity maintaining ratio was relatively increased while the discharge capacity maintaining ratio was nearly maintained. In addition, when the electrolytic solution included heteropoly acid as an additive, the swelling amount was significantly decreased.

From the results shown in Tables 1 to 4, it can be seen that in a case where the negative electrode active material was a metal-based material, when the positive electrode active material was the lithium composite oxide of the above-described composition, an excellent battery capacity characteristic and cycle characteristics were obtained.

Hereinbefore, the present disclosure is described with reference to the embodiments and the examples, but the present disclosure is not limited to the embodiments and the examples; various modifications can be made. For example, the positive electrode active material of the embodiments of the present disclosure may be applied to a lithium ion secondary battery in which a capacity of a negative electrode includes a capacity by occlusion and emission of lithium ions and a capacity accompanied with a precipitation and dissolution of the lithium ions, and is represented by a sum of the capacities. In this case, a chargeable capacity of a negative electrode material is set to be smaller than that of a discharge capacity of a positive electrode.

In addition, in the embodiments and examples, description is given to a case where a structure of the battery is a cylinder type, a laminated film type, or a coin type, or a case where the battery device has a winding structure, but the present disclosure is not limited thereto. The lithium ion secondary battery according to embodiments of the present disclosure may be equally applied to a case where the lithium ion secondary battery has another battery structure such as a coin type, a square type, and a button type, or a case where the battery device has another structure such as a laminated structure.

In addition, in the embodiments and examples, with respect to a composition (values of a to d) of the second lithium composite oxide expressed by equation (1), an appropriate range derived from results of examples is described. However, this description does not absolutely deny a possibility that the composition may depart from the above-described range. That is, the above-described appropriate range is a particularly desirable range to obtain an effect of the present disclosure to the utmost, such that the composition may be deviated from the above-described range as long as the effect of the present disclosure can be obtained.

In addition, for example, the positive electrode active material of the embodiments of the present disclosure is not limited to an application to the lithium ion secondary battery and may be applied to another device such as a capacitor or the like.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A lithium ion secondary battery comprising:

a positive electrode;

a negative electrode; and an electrolytic solution, wherein the positive electrode contains a lithium composite oxide, the negative electrode contains an oxide including at least one of silicon Si and tin Sn, the lithium composite oxide includes lithium Li having composition ratio a, a first element having composition ratio b, and a second element having composition ratio c, said first element being two kinds or more selected from the group consisting of manganese Mn, nickel Ni, and cobalt Co, and including at least manganese, said second element being at least one kind selected from the group consisting of aluminum Al, titanium Ti, magnesium Mg, and boron B, and the composition ratios a to c satisfy $1.1<a<1.3$, $0.7<b+c<1.1$, $0<c<0.1$, and $a>b+c$, wherein a covering layer is provided on a surface of the lithium composite oxide to cover at least a part of the surface, said covering layer includes a third element, and wherein at least a part of the third element is crystalline in structure, and the third element is in a surface region of the lithium composite oxide ranging from an outermost surface of the lithium composite oxide to a thickness corresponding to 0.1% of a particle size.

2. The lithium ion secondary battery according to claim 1, wherein the lithium composite oxide is a compound expressed by: $Li_aM1_bM2_cO_d$ wherein M1 is two kinds or more selected from the group consisting of manganese, nickel, and cobalt, and M1 includes at least manganese, M2 is at least one kind selected from the group consisting of aluminum, titanium, magnesium, and boron, and a to d satisfy $1.1<a<1.3$, $0.7<b+c<1.1$, $0<c<0.1$, $a>b+c$, $1.8<d<2.5$.

3. The lithium ion secondary battery according to claim 1, wherein in the lithium composite oxide, the second element is unevenly distributed with respect to concentration in a direction from a surface of the lithium composite oxide to a center thereof.

4. The lithium ion secondary battery according to claim 1, wherein the first elements are manganese, nickel, and cobalt, and the second element includes aluminum.

5. The lithium ion secondary battery according to claim 1, wherein the composition ratio a satisfies $1.1<a<1.25$.

6. The lithium ion secondary battery according to claim 1, wherein the third element is at least one kind selected from the group consisting of magnesium, calcium Ca, titanium, zirconium Zr, sulfur S, fluorine F, iron Fe, copper Cu, boron, aluminum, phosphorous P, carbon C, manganese, nickel, and cobalt.

7. The lithium ion secondary battery according to claim 6, wherein the third element includes an element in common with the second element.

8. The lithium ion secondary battery according to claim 6, wherein the second element of the composite oxide is substituted with the third element included in the covering layer.

9. The lithium ion secondary battery according to claim 6, wherein the third element includes magnesium.

10. The lithium ion secondary battery according to claim 6, wherein a part of the lithium composite oxide is substituted with the third element, and a content of the third element in the lithium composite oxide is 0.01 to 5 mol % with respect to a content of the lithium.

11. The lithium ion secondary battery according to claim 6, wherein the covering layer is formed by depositing a compound including the third element onto the surface of the lithium composite oxide through a mechanochemical reaction and by baking the deposited compound.

12. The lithium ion secondary battery according to claim 11, wherein the compound including the third element forms a solid solution with the lithium composite oxide.

13. The lithium ion secondary battery according to claim 1, wherein at least one of the positive electrode, the negative electrode, and the electrolytic solution includes at least one of heteropoly acid and a heteropoly acid compound.

14. The lithium ion secondary battery according to claim 1, wherein a gel-type coating is formed on at least one of the positive electrode and the negative electrode, and the gel-type coating includes at least one of amorphous poly acid and a poly acid salt compound which have one kind or more of poly elements.

15. The lithium ion secondary battery according to claim 14, wherein the gel-type film is derived from at least one of heteropoly acid and a heteropoly acid compound.

16. The lithium ion secondary battery according to claim 14, wherein at least one of the poly acid and the poly acid salt compound includes a hexavalent poly atomic ion and a poly atomic ion less than hexa valence.

17. An electric tool, wherein the electric tool operates using a lithium ion secondary battery including a positive electrode, a negative electrode, and an electrolytic solution as a power source, the positive electrode contains a lithium composite oxide, the negative electrode contains an oxide including at least one of silicon Si and tin Sn, the lithium composite oxide includes Lithium Li having composition ratio a, a first element having a composition ratio b, and a second element having composition ratio c, said first element including two kinds or more selected from the group consisting of manganese Mn, nickel Ni, and cobalt Co, and including at least manganese, and said second element including at least one kind selected from the group consisting of aluminum Al, titanium Ti, magnesium Mg, and boron B, and the composition ratios a to c satisfy $1.1<a<1.3$, $0.7<b+c<1.1$, $0<c<0.1$, and $a>b+c$, wherein a covering layer is provided on a surface of the lithium composite oxide to cover at least a part of the surface, said covering layer includes a third element, and wherein at least a part of the third element is crystalline in structure, and the third element is in a surface region of the lithium composite oxide ranging from an outermost surface of the lithium composite oxide to a thickness corresponding to 0.1% of a particle size.

18. An electric vehicle, wherein the electric vehicle operates using a lithium ion secondary battery including a positive electrode, a negative electrode, and an electrolytic solution as a power source, the positive electrode contains a lithium composite oxide, the negative electrode contains an oxide including at least one of silicon Si and tin Sn, the lithium composite oxide includes lithium Li having composition ratio a, a first element having composition ratio b, and a second element having composition ratio c, said first element including two kinds or more selected from the group consisting of manganese Mn, nickel Ni, and cobalt Co, and including at least manganese, said second element including at least one kind selected from the group consisting of aluminum Al, titanium Ti, magnesium Mg, and boron B, and the composition ratios a to c satisfy $1.1<a<1.3$, $0.7<b+c<1.1$, $0<c<0.1$, and $a>b+c$, wherein a covering layer is provided on a surface of the lithium composite oxide to cover at least a part of the surface, said covering layer includes a third element, and wherein at least a part of the third element is crystalline in structure, and the third element is in a surface region of the lithium composite oxide ranging from an outermost surface of the lithium composite oxide to a thickness corresponding to 0.1% of a particle size.

19. A power storage system, wherein the power storage system uses a lithium ion secondary battery including a positive electrode, a negative electrode, and an electrolytic solution as a power storage source, the positive electrode contains a lithium composite oxide, the negative electrode contains an oxide including at least one of silicon Si and tin Sn, the lithium composite oxide includes lithium Li having composition ratio a, a first element having composition ratio b, and a second element having composition ratio c, said first element including two kinds or more selected from the group consisting of manganese Mn, nickel Ni, and cobalt Co, and including at least manganese, said second element including at least one kind selected from the group consisting of aluminum Al, titanium Ti, magnesium Mg, and boron B, and the composition ratios a to c satisfy $1.1<a<1.3$, $0.7<b+c<1.1$, $0<c<0.1$, and $a>b+c$, wherein a covering layer is provided on a surface of the lithium composite oxide to cover at least a part of the surface, said covering layer includes a third element, and wherein at least a part of the third element is crystalline in structure, and the third element is in a surface region of the lithium composite oxide ranging from an outermost surface of the lithium composite oxide to a thickness corresponding to 0.1% of a particle size.

* * * * *